(12) United States Patent
Li

(10) Patent No.: US 12,738,771 B2
(45) Date of Patent: Sep. 15, 2026

(54) WIRELESS CHARGING CIRCUIT, WIRELESS CHARGING METHOD, DEVICE, AND SYSTEM

(71) Applicant: Huawei Digital Power Technologies Co., Ltd., Shenzhen (CN)

(72) Inventor: Yuechao Li, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 1070 days.

(21) Appl. No.: 17/886,724

(22) Filed: Aug. 12, 2022

(65) Prior Publication Data

US 2022/0393515 A1 Dec. 8, 2022

Related U.S. Application Data

(63) Continuation of application No. PCT/CN2020/125829, filed on Nov. 2, 2020.

(30) Foreign Application Priority Data

Feb. 12, 2020 (CN) ........................ 202010089150.X

(51) Int. Cl.

*H02J 50/60* (2016.01)
*H02J 7/80* (2026.01)
*H02J 50/12* (2016.01)

(52) U.S. Cl.

CPC ................ *H02J 50/60* (2016.02); *H02J 7/80* (2026.01); *H02J 50/12* (2016.02)

(58) Field of Classification Search

CPC ...................................................... H02J 50/60
USPC ......................................................... 320/108
See application file for complete search history.

(56) References Cited

U.S. PATENT DOCUMENTS 10,199,881 B2 * 2/2019 Muratov ................ H02J 50/10
2003/0174071 A1 9/2003 Hilliard et al.
2004/0056778 A1 3/2004 Hilliard
2010/0013321 A1 1/2010 Onishi et al.
2015/0285926 A1 10/2015 Oettinger
(Continued)

FOREIGN PATENT DOCUMENTS

CN 106685029 A 5/2017
CN 107204699 A 9/2017
(Continued)

*Primary Examiner* — Ahmed H Omar
(74) *Attorney, Agent, or Firm* — Maier & Maier, PLLC

(57) ABSTRACT

The wireless charging circuit includes an oscillation circuit and a monitoring circuit that are sequentially connected. The oscillation circuit includes an excitation voltage source, a full-bridge circuit, and an LC series circuit that are connected in series. When damped oscillation occurs in the LC series circuit, the LC series circuit outputs a resonant voltage signal during damped oscillation to the monitoring circuit. The monitoring circuit includes a comparison module and a processing module. The comparison module is configured to receive the resonant voltage signal and convert the resonant voltage signal into a digital square wave signal. The processing module is configured to receive the digital square wave signal, obtain a quantity of peaks, a quantity of troughs, or a sum of the quantity of peaks and the quantity of troughs and that is in a resonant voltage attenuation waveform, determine a quality factor Q.

18 Claims, 13 Drawing Sheets

(56) References Cited

U.S. PATENT DOCUMENTS

| | | | | |
|---|---|---|---|---|
| 2018/0337557 | A1 | 11/2018 | Chen et al. | |
| 2019/0199142 | A1 | 6/2019 | Muratov et al. | |
| 2020/0185974 | A1* | 6/2020 | Chen | H02J 50/12 |

FOREIGN PATENT DOCUMENTS

| | | | | |
|---|---|---|---|---|
| CN | 107947395 | A | 4/2018 | |
| CN | 207939234 | U | 10/2018 | |
| CN | 108923552 | A | * 11/2018 | H02J 50/60 |
| CN | 109004771 | A | 12/2018 | |
| CN | 109038850 | A | 12/2018 | |
| CN | 111211598 | A | 5/2020 | |
| JP | 2013132133 | A | 7/2013 | |
| JP | 2015076801 | A | 4/2015 | |
| KR | 1020180003810 | A | 1/2018 | |

* cited by examiner

WIRELESS CHARGING CIRCUIT, WIRELESS CHARGING METHOD, DEVICE, AND SYSTEM

CROSS-REFERENCE TO RELATED APPLICATIONS

This application is a continuation of International Application No. PCT/CN2020/125829, filed on Nov. 2, 2020, which claims priority to Chinese Patent Application No. 202010089150.X, filed on Feb. 12, 2020. The disclosures of the aforementioned applications are hereby incorporated by reference in their entireties.

TECHNICAL FIELD

The embodiments relate to the field of wireless charging technologies, a wireless charging circuit, a wireless charging method, a device, and a system.

BACKGROUND

Wireless charging refers to a process in which a device that is charged based on an electromagnetic wave induction principle. The principle is similar to that of a transformer. There is a coil at a transmit terminal and a coil at a receive terminal. The coil at the transmit terminal is connected to a wired power supply and generates an electromagnetic signal. The coil at the receive terminal induces the electromagnetic signal from the transmit terminal and converts the electromagnetic signal into a required direct current, to charge a battery at the receive terminal.

The Qi standard is a "wireless charging" standard launched by the Wireless Power Consortium (WPC) and has two features: convenience and universality. With development and popularization of wireless charging technologies, many wireless charging products emerge in the market. In particular, wireless charging products based on the Qi standard of the WPC have a large market share.

When wireless charging is performed on the receive terminal such as a mobile phone, the transmit terminal needs to monitor and identify the receive terminal in real time. When identifying the receive terminal, the transmit terminal starts to transmit power in the wireless charging coil. In addition, a charging environment in the wireless charging coil also needs to be monitored. If there is a foreign object in the coil, for example, a bank card, an identity card, or another metal foreign object, a magnetic field generates an eddy current, and these foreign objects consume power in the wireless charging coil. This reduces charging efficiency, and also causes an accident such as a fire. Therefore, foreign object monitoring becomes a primary problem to ensure safety in a wireless charging process.

SUMMARY

The embodiments may provide a wireless charging circuit and a wireless charging method. The wireless charging circuit can monitor a foreign object more accurately by using a Q value.

According to a first aspect, an embodiment may provide a wireless charging circuit. The circuit includes an oscillation circuit and a monitoring circuit that are sequentially connected. The oscillation circuit includes an excitation voltage source Us, a full-bridge circuit, and an LC series circuit that are connected in series. The excitation voltage source Us is configured to provide a stable voltage for the LC series circuit.

Further, the full-bridge circuit includes a first bridge arm and a second bridge arm that are connected in parallel. The first bridge arm includes a first switching transistor Q1 and a third switching transistor Q3. The second bridge arm includes a second switching transistor Q2 and a fourth switching transistor Q4. The LC series circuit includes an inductor Lp and a resonance capacitor Cp that are connected in series. One terminal of the LC series circuit is connected to a phase midpoint of the first bridge arm, and the other terminal is connected to a phase midpoint of the second bridge arm. A phase center of the LC series circuit is connected to the monitoring circuit and is configured to output a resonant voltage signal during damped oscillation to the monitoring circuit.

The monitoring circuit includes a comparison module and a processing module. The comparison module is configured to receive the resonant voltage signal output by the oscillation circuit and convert the resonant voltage signal into a digital square wave signal. The processing module is configured to: receive the digital square wave signal, obtain a resonant voltage attenuation waveform during damped oscillation based on turn-on and turn-off of the switching transistors Q1 to Q4, obtain a first parameter that meets a first preset condition and that is in the resonant voltage attenuation waveform, and determine a quality factor Q based on the first parameter. The first parameter includes a quantity of peaks, a quantity of troughs, or a sum of the quantity of peaks and the quantity of troughs.

In addition, the processing module is further configured to monitor a foreign object based on the quality factor Q to obtain a monitoring result. The quality factor Q represents a ratio of power stored in the oscillation circuit to a power loss in each cycle. A larger Q value indicates a smaller loss of this charging circuit in a same cycle and better performance.

According to the wireless charging circuit provided in this embodiment, in a design of the full-bridge circuit including the first bridge arm and the second bridge arm, turn-on and turn-off of the switching transistors in the full-bridge circuit are controlled, to implement charging and discharging of the oscillation circuit. In addition, the monitoring circuit determines, based on the waveform of the resonant voltage output by the oscillation circuit, the quantity of peaks, the quantity of troughs, or the sum of the quantity of peaks and the quantity of troughs that meets the preset condition, and calculates the quality factor Q, to monitor the foreign object by using the Q value.

The comparison module includes a comparator. Further, the comparator is a voltage comparator. One input terminal of the voltage comparator is connected to a reference power supply and is configured to obtain a reference voltage, and the other input terminal is connected to an output terminal of the oscillation circuit and is configured to receive a resonant voltage generated by the oscillation circuit. An output terminal of the comparator is connected to the processing module.

In addition, the comparator may alternatively be replaced with another circuit, for example, an operational amplifier. The comparison module may further include another auxiliary control circuit. This is not limited in this embodiment.

In the first aspect, the first preset condition is that in each oscillation cycle, the resonant voltage generated during damped oscillation is greater than the reference voltage. When a voltage of the phase midpoint of the LC series circuit to ground reaches an amplitude voltage of the excitation voltage source Us, the damped oscillation occurs in the oscillation circuit to generate the resonant voltage.

Further, in the first aspect, there may be the following three possible implementations for the first parameter.

In a first possible implementation, the first parameter includes the quantity of peaks. The quantity of peaks that meets the first preset condition is the quantity of peaks that meets the first preset condition and that is determined, based on the digital square wave signal output by the comparison module, by the processing module when the first switching transistor Q1 of the first bridge arm is off, the third switching transistor Q3 of the first bridge arm is on, the second switching transistor Q2 of the second bridge arm is changed from on to off, and the fourth switching transistor Q4 of the second bridge arm is changed from off to on.

In a second possible implementation, the first parameter includes the quantity of troughs. The quantity of troughs that meets the first preset condition is the quantity of troughs that meets the first preset condition and that is determined, based on the digital square wave signal output by the comparison module, by the processing module when the second switching transistor Q2 of the second bridge arm is off, the fourth switching transistor Q4 of the second bridge arm is on, the first switching transistor Q1 of the first bridge arm is changed from on to off, and the third switching transistor Q3 of the first bridge arm is changed from off to on.

In a third possible implementation, the first parameter includes the sum of the quantity of peaks and the quantity of troughs. The sum is the sum of the quantity of peaks that meets the first preset condition and the quantity of troughs that meets the first preset condition.

With reference to the first aspect, in a possible implementation of the first aspect, the processing module may be configured to determine, based on the first parameter, the quality factor Q:

$$Q = \frac{n \cdot \pi}{m \cdot \ln(|U1/U2|)},$$

where m and n are both positive integers, m≥1, and U1 and U2 are any peak voltage or any trough voltage in the resonant voltage attenuation waveform.

Further, when the first parameter is the quantity of peaks or the quantity of troughs and m=1, the quality factor Q is:

$$Q = \frac{n \cdot \pi}{\ln(|U1/U2|)},$$

where n is the quantity of peaks or the quantity of troughs.

When the first parameter is the sum of the quantity of peaks and the quantity of troughs and m=2, the quality factor Q is:

$$Q = \frac{n \cdot \pi}{2\ln(|U1/U2|)},$$

where n is the sum of the quantity of peaks and the quantity of troughs.

According to the method provided in this embodiment, under the Q value, a measurement step unit is determined based on m. A larger value of m indicates a smaller step unit and higher measurement accuracy. When the first parameter is the sum of the quantity of peaks and the quantity of troughs, the value of m is 2. Compared with the case in which the Q value is determined based on either the quantity of peaks or the quantity of troughs, this case halves the measurement step unit, to double accuracy of the Q value and enhance a capability of identifying the foreign object. For example, the turn-on and turn-off of the four switching transistors in the full-bridge circuit are controlled, to change the measurement step unit of the Q value from an original integer to half of the integer. Because the step unit is reduced, a measurement result is more accurate, and whether the foreign object exists in the coil can be more accurately determined, to improve measurement accuracy.

In the foregoing Q value calculation equation, $$Q = \frac{n \cdot \pi}{m \cdot \ln(|U1/U2|)},$$

where when the Q value is specific, n is proportional to m, and n is inversely proportional to 1/m.

In addition, $$n = \frac{(t_2 - t_1)}{\frac{T_0}{m}},$$

a peak or trough voltage U1 of the oscillation waveform corresponds to a moment t1, and a peak or trough voltage U2 of the oscillation waveform corresponds to a moment t2. There may be the following four scenarios for t1 and t2:

t1 is a peak moment of the oscillation waveform, and t2 is another peak moment of the oscillation waveform;

t1 is a peak moment of the oscillation waveform, and t2 is a trough moment of the oscillation waveform;

t1 is a trough moment of the oscillation waveform, and t2 is another peak moment of the oscillation waveform; or t1 is a trough moment of the oscillation waveform, and t2 is another trough moment of the oscillation waveform.

The larger value of m indicates the smaller step unit, the higher measurement accuracy, and the more accurate measurement result.

According to a second aspect, an embodiment may further provide another wireless charging circuit. The circuit includes an oscillation circuit and a monitoring circuit that are sequentially connected. The oscillation circuit includes an excitation voltage source Us, a half-bridge circuit, and an LC series circuit that are connected in series. The excitation voltage source Us is configured to provide a stable voltage for the LC series circuit.

Further, the half-bridge circuit includes a fifth switching transistor Q5 and a sixth switching transistor Q6 that are connected in series. The LC series circuit includes an inductor Lp and a resonance capacitor Cp that are connected in series. One terminal of the LC series circuit is connected to a phase midpoint of the half-bridge circuit, and the other terminal is connected to the ground. A phase center of the LC series circuit is connected to the monitoring circuit and is configured to output a resonant voltage signal during damped oscillation to the monitoring circuit.

The monitoring circuit includes a voltage biasing module, a comparison module, and a processing module. The voltage biasing module is connected to the oscillation circuit and is configured to receive the resonant voltage signal output by the oscillation circuit, bias the resonant voltage signal, and transmit a biased resonant voltage signal to the comparison module. The comparison module receives the biased resonant voltage signal, converts the biased resonant voltage signal into a digital square wave signal, and outputs the digital square wave signal to the processing module. The processing module is configured to: receive the digital square wave signal, obtain a resonant voltage attenuation waveform during damped oscillation based on turn-on and turn-off of the switching transistors Q1 to Q4, obtain a second parameter that meets a second preset condition and that is in the resonant voltage attenuation waveform, and determine a quality factor Q based on the second parameter, where the second parameter includes a sum of a quantity of peaks and a quantity of troughs. The processing module is further configured to monitor a foreign object based on the quality factor Q to obtain a monitoring result. The quality factor Q represents a ratio of power stored in the oscillation circuit to a power loss in each cycle.

In this aspect, the half-bridge circuit is designed in the oscillation circuit. Turn-on and turn-off of the fifth switching transistor Q5 and the sixth switching transistor Q6 in the half-bridge circuit are controlled, to implement the half-cycle oscillation circuit. The comparison module processes a resonant voltage output by the oscillation circuit to obtain the second parameter and an oscillation frequency, and calculates a Q value, to monitor the foreign object in a wireless charging coil.

In addition, this circuit can also measure and obtain the sum of the quantity of peaks and the quantity of troughs in a half cycle, to calculate the Q value. Compared with the case in which the voltage comparator is used for calculating the Q value, this case halves a measurement step unit. Because the step unit is smaller, a measurement result is more accurate, and whether the foreign object exists in the coil can be more accurately determined, to double monitoring accuracy of the Q value and enhance a capability of identifying the foreign object.

The second preset condition is: $Uc+V_{ref\ 0}>V_{ref\ 1}$ or $Uc+V_{ref\ 0}<V_{ref\ 2}$, where Uc is a resonant voltage generated during damped oscillation, $V_{ref\ 0}$ is a bias voltage, $Uc+V_{ref\ 0}$ is a resonant voltage biased by the voltage biasing module, $V_{ref\ 1}$ is a first reference voltage, and $V_{ref\ 2}$ is a second reference voltage; and when a voltage of the phase midpoint of the LC series circuit to ground reaches an amplitude voltage of the excitation voltage source Us, the damped oscillation occurs in the oscillation circuit to generate the resonant voltage.

With reference to the second aspect, in a possible implementation of the second aspect, the sum of the quantity of peaks and the quantity of troughs is the sum of the quantity of peaks and the quantity of troughs that meets the second preset condition and that is determined, based on the digital square wave signal output by the comparison module, by the processing module when the fifth switching transistor Q5 is changed from on to off and the sixth switching transistor Q6 is changed from off to on.

The switching transistors Q5 and Q6 may be controlled by a control circuit connected to the switching transistors Q5 and Q6. For example, both the switching transistors Q5 and Q6 are diodes, MOSFET transistors, IGBTs, or the like, and the control circuit is connected to a gate of each switching transistor and configured to drive the switching transistors Q5 and Q6 to be turned on or off.

With reference to the second aspect, in a possible implementation of the second aspect, an input terminal of the comparison module is connected to an output terminal of the voltage biasing module, and an output terminal is connected to the processing module.

The comparison module includes a first comparator and a second comparator. The first comparator and the second comparator may each include a first input terminal, a second input terminal, and an output terminal. The first input terminal of the first comparator is connected to a first voltage source and is configured to obtain the first reference voltage provided by the first voltage source. The second input terminal of the first comparator and the first input terminal of the second comparator are connected to each other to be used as the input terminal of the comparison module. The second input terminal of the second comparator is connected to a second voltage source and is configured to obtain the second reference voltage provided by the second voltage source. The output terminal of the first comparator and the output terminal of the second comparator are connected to each other to be used as the output terminal of the comparison module.

The first reference voltage and the second reference voltage may be positive values or negative values.

With reference to the second aspect, in another possible implementation of the second aspect, the processing module may be configured to determine, based on the second parameter, the quality factor Q:

$$Q = \frac{n \cdot \pi}{m \cdot \ln\left(\left|\frac{U_0}{\Delta V}\right|\right)},$$

where n and m are both positive integers, m≥1, $U_0$ is a voltage amplitude of the excitation voltage source Us, ΔV is a voltage difference between a bias voltage and a reference voltage, and the reference voltage is the first reference voltage or the second reference voltage.

Further, when m=2, the quality factor Q is:

$$Q = \frac{n \cdot \pi}{2 \cdot \ln\left(\left|\frac{U_0}{\Delta V}\right|\right)},$$

where n is the sum of the quantity of peaks and the quantity of troughs.

In each half cycle, if $Uc+V_{ref\ 0}>\Delta V$ and $\Delta V=V_{ref\ 1}-V_{ref\ 0}$, or if $Uc+V_{ref\ 0}<\Delta V$ and $\Delta V=V_{ref\ 0}-V_{ref\ 2}$, the second preset condition is met, a high level is output, and a rising edge is generated, where Uc is the resonant voltage output by the oscillation circuit, ΔV is the voltage difference, $\Delta V=V_{ref\ 1}-V_{ref\ 1}=V_{ref\ 0}-V_{ref\ 2}$, $V_{ref\ 0}$ is the bias voltage, $V_{ref\ 1}$ is the first reference voltage, and $V_{ref\ 2}$ is the second reference voltage.

If $V_{ref\ 2}\leq Uc+V_{ref\ 0}\leq V_{ref\ 1}$, the second preset condition is not met, a high level is not generated, and a low level signal is output.

According to a third aspect, an embodiment may further provide a wireless charging method. The method is applied to a wireless charging circuit. This circuit and the wireless charging circuit according to the first aspect have a same structure. The wireless charging circuit may include an oscillation circuit and a monitoring circuit that are sequentially connected.

The oscillation circuit includes an excitation voltage source Us, a full-bridge circuit, and an LC series circuit that are connected in series. The excitation voltage source Us is configured to provide a stable voltage for the LC series circuit. The full-bridge circuit includes a first bridge arm and a second bridge arm that are connected in parallel. The first bridge arm includes a first switching transistor Q1 and a third switching transistor Q3. The second bridge arm includes a second switching transistor Q2 and a fourth switching transistor Q4. The LC series circuit includes an inductor Lp and a resonance capacitor Cp that are connected in series. One terminal of the LC series circuit is connected to a phase midpoint of the first bridge arm, and the other terminal is connected to a phase midpoint of the second bridge arm. A phase midpoint of the LC series circuit is connected to the monitoring circuit and is configured to output a resonant voltage signal during damped oscillation to the monitoring circuit. The monitoring circuit includes a comparison module and a processing module. The comparison module is configured to receive the resonant voltage signal and convert the resonant voltage signal into a digital square wave signal.

The method includes:

The processing module receives the digital square wave signal, where the digital square wave signal is generated by converting the resonant voltage signal.

The processing module obtains a resonant voltage attenuation waveform during damped oscillation based on turn-on and turn-off of the switching transistors Q1 to Q4, and obtains, based on the resonant voltage attenuation waveform, a first parameter that meets a first preset condition, where the first parameter includes a quantity of peaks, a quantity of troughs, or a sum of the quantity of peaks and the quantity of troughs.

The processing module determines a quality factor Q based on the first parameter.

The processing module monitors a foreign object based on the quality factor Q to obtain a monitoring result.

The first preset condition is that in each oscillation cycle, the resonant voltage generated during damped oscillation is greater than the reference voltage. When a voltage of the phase midpoint of the LC series circuit to ground reaches an amplitude voltage of the excitation voltage source Us, the damped oscillation occurs in the oscillation circuit to generate the resonant voltage.

With reference to the third aspect, in a possible implementation of the third aspect,

- the first parameter includes the quantity of peaks, and the quantity of peaks that meets the first preset condition is the quantity of peaks that meets the first preset condition and that is determined, based on the digital square wave signal output by the comparison module, by the processing module when the first switching transistor Q1 of the first bridge arm is off, the third switching transistor Q3 of the first bridge arm is on, the second switching transistor Q2 of the second bridge arm is changed from on to off, and the fourth switching transistor Q4 of the second bridge arm is changed from off to on;
- the first parameter includes the quantity of troughs, and the quantity of troughs that meets the first preset condition is the quantity of troughs that meets the first preset condition and that is determined, based on the digital square wave signal output by the comparison module, by the processing module when the second switching transistor Q2 of the second bridge arm is off, the fourth switching transistor Q4 of the second bridge arm is on, the first switching transistor Q1 of the first bridge arm is changed from on to off, and the third switching transistor Q3 of the first bridge arm is changed from off to on; or
- the first parameter includes the sum of the quantity of peaks and the quantity of troughs, and the sum is the sum of the quantity of peaks that meets the first preset condition and the quantity of troughs that meets the first preset condition.

With reference to the third aspect, in another possible implementation of the third aspect, that the processing module determines a quality factor Q based on the first parameter includes: The processing module determines, based on the first parameter, the quality factor Q:

$$Q = \frac{n \cdot \pi}{m \cdot \ln(|U1/U2|)},$$

where n and m are both positive integers, m≥1, and U1 and U2 are any peak voltage or any trough voltage in the resonant voltage attenuation waveform.

Further, when m=2, the quality factor Q is:

$$Q = \frac{n \cdot \pi}{2 \cdot \ln(|U1/U2|)},$$

where n is the sum of the quantity of peaks and the quantity of troughs.

In addition, with reference to the third aspect, in still another possible implementation of the third aspect, the monitoring a foreign object includes: if the quality factor Q is less than or equal to a first threshold, determining that the foreign object exists in a wireless charging coil; if the quality factor Q is greater than a first threshold and less than or equal to a second threshold, determining that the foreign object may exist in a wireless charging coil and needs to be further inspected; or if the quality factor Q is greater than a second threshold, determining that no foreign object exists in a wireless charging coil. A user may set the first threshold and the second threshold.

According to a fourth aspect, an embodiment may further provide another wireless charging method. The method is applied to a wireless charging circuit. This circuit and the wireless charging circuit according to the second aspect have a same structure. The wireless charging circuit includes an oscillation circuit and a monitoring circuit that are sequentially connected.

The oscillation circuit includes an excitation voltage source Us, a half-bridge circuit, and an LC series circuit that are connected in series. The excitation voltage source Us is configured to provide a stable voltage for the LC series circuit. The half-bridge circuit includes a fifth switching transistor Q5 and a sixth switching transistor Q6 that are connected in series. The LC series circuit includes an inductor Lp and a resonance capacitor Cp that are connected in series. One terminal of the LC series circuit is connected to a phase midpoint of the half-bridge circuit, and the other terminal is connected to the ground. A phase midpoint of the LC series circuit is connected to the monitoring circuit and is configured to output a resonant voltage signal during damped oscillation to the monitoring circuit. The monitoring circuit includes a voltage biasing module, a comparison module, and a processing module. The voltage biasing module receives the resonant voltage signal, biases the resonant voltage signal, and transmits a biased resonant voltage signal to the comparison module. The comparison module receives the biased resonant voltage signal, converts the biased resonant voltage signal into a digital square wave signal, and then outputs the digital square wave signal to the processing module.

The method includes:

The processing module receives the digital square wave signal.

The processing module obtains a resonant voltage attenuation waveform during damped oscillation based on turn-on and turn-off of the switching transistors Q1 to Q4 and obtains a second parameter that meets a second preset condition and that is in the resonant voltage attenuation waveform, where the second parameter includes a sum of a quantity of peaks and a quantity of troughs. The processing module determines a quality factor Q based on the second parameter.

The processing module is further configured to monitor a foreign object based on the quality factor Q to obtain a monitoring result.

Further, the second preset condition is $Uc+V_{ref\,0}>V_{ref\,1}$ or $Uc+V_{ref\,0}<V_{ref\,2}$, where $V_{ref\,1}$ is a first reference voltage, $V_{ref\,2}$ is a second reference voltage, $V_{ref\,0}$ is a bias voltage, Uc is a resonant voltage generated during damped oscillation, and $Uc+V_{ref\,0}$ is a resonant electricity biased by the voltage biasing module.

When a voltage of the phase midpoint of the LC series circuit to ground reaches an amplitude voltage of the excitation voltage source Us, the damped oscillation occurs in the oscillation circuit to generate the resonant voltage.

With reference to the fourth aspect, in a possible implementation of the fourth aspect, the sum of the quantity of peaks and the quantity of troughs is the sum of the quantity of peaks and the quantity of troughs that meets the second preset condition and that is determined, based on the digital square wave signal output by the comparison module, by the processing module when the fifth switching transistor Q5 is changed from on to off and the sixth switching transistor Q6 is changed from off to on.

With reference to the fourth aspect, in another possible implementation of the fourth aspect, that the processing module determines a quality factor Q based on the second parameter includes: The processing module determines, based on the second parameter, the quality factor Q:

$$Q = \frac{n \cdot \pi}{m \cdot \ln\left(\left|\frac{U_0}{\Delta V}\right|\right)},$$

where n and m are both positive integers, m≥1, $U_0$ is a voltage amplitude of the excitation voltage source Us, ΔV is a voltage difference between a bias voltage and a reference voltage, and the reference voltage is the first reference voltage or the second reference voltage.

Further, when m=2, the quality factor Q is:

$$Q = \frac{n \cdot \pi}{2 \cdot \ln\left(\left|\frac{U_0}{\Delta V}\right|\right)},$$

where n is the sum of the quantity of peaks and the quantity of troughs.

According to a fifth aspect, an embodiment may further provide a processing apparatus. The processing apparatus includes a processor and a memory. The processor is coupled to the memory. Further, the processor is configured to: run or execute computer program instructions stored in the memory, and invoke data in the memory, to perform the method in the implementations of the third aspect or the fourth aspect and monitor, based on a Q value, whether a foreign object exists in a charging coil.

Optionally, the processor is a processing chip or a processing module.

Optionally, the processor is a random access memory (RAM) or a nonvolatile memory such as a flash memory or a hard disk.

According to a sixth aspect, an embodiment may further provide a device. The device is a transmit device or a receive device. The transmit device or the receive device includes the wireless charging circuit in the first aspect and the implementations of the first aspect. In addition, the wireless charging circuit is used for implementing the method according to the second aspect and the implementations of the second aspect and monitoring the foreign object.

The monitoring process may include: determining a relationship between the quality factor Q value and both of a first threshold and a second threshold.

If a quality factor Q is less than or equal to the first threshold, it is determined that the foreign object exists in a wireless charging coil.

If a quality factor Q is greater than the first threshold and is less than or equal to the second threshold, the foreign object may exist in a wireless charging coil and may need to be further inspected.

If a quality factor Q is greater than the second threshold, it is determined that no foreign object exists in a wireless charging coil.

In addition, whether the foreign object exists may alternatively be monitored by using other methods or strategies.

According to a seventh aspect, an embodiment may further provide a wireless charging system. The system includes a transmit device and a receive device. The transmit device includes the wireless charging circuit according to the first aspect or the second aspect. The receive device is a to-be-charged device.

Optionally, the receive device further includes the wireless charging circuit according to the first aspect or the second aspect, to monitor a foreign object.

According to an eighth aspect, an embodiment may further provide a non-transitory computer-readable storage medium. The non-transitory computer-readable storage medium stores instructions. When the instructions are run on a computer or a processor, the method according to the implementations of the third aspect or the fourth aspect is performed.

Further, a computer program product is provided. The computer program product includes computer instructions. When the instructions are executed by a computer or a processor, the method according to the implementations of the third aspect or the fourth aspect may be performed.

DETAILED DESCRIPTION OF THE EMBODIMENTS

Figure 1:
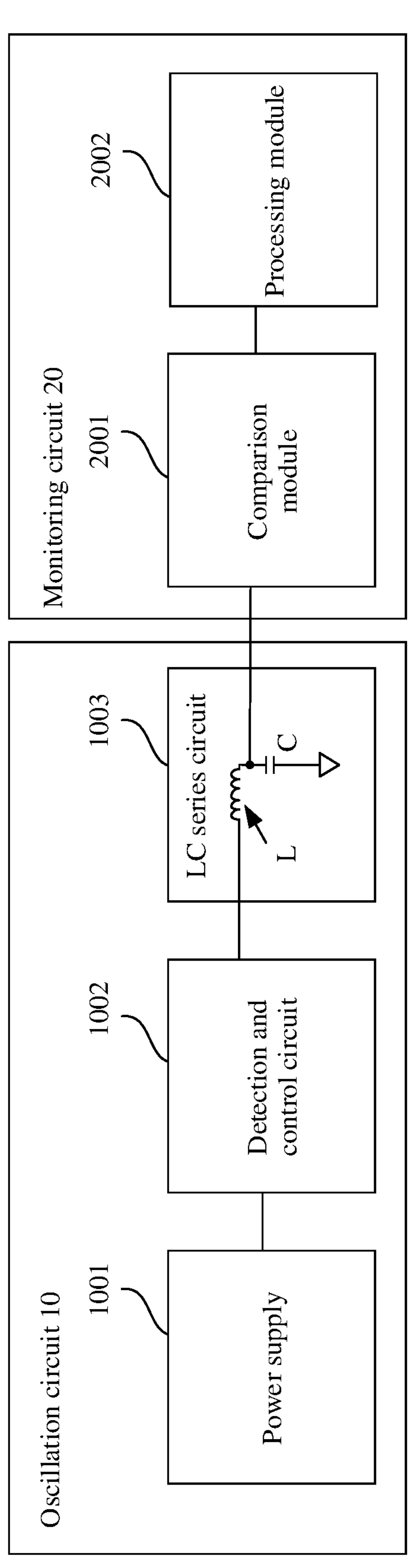
FIG. 1 is a schematic diagram of a structure of a wireless charging circuit according to an embodiment.

To make a person skilled in the art understand the embodiments better, and make the objectives, features, and advantages of embodiments clearer, the following further describes the embodiments in detail with reference to the accompanying drawings.

The embodiments may be applied to a wireless charging technology. The scenario includes a wireless charging device and a to-be-charged device. The wireless charging device is configured to charge the to-be-charged device capable of being wirelessly charged. For example, the wireless charging device may be a wireless charging mobile power supply, a wireless charging board, a wireless charger, or the like. The to-be-charged device includes an electronic device with a built-in rechargeable battery, such as a mobile phone, a tablet, a notebook computer, an in-vehicle apparatus, or a digital camera.

The wireless charging device may also be referred to as a transmit device. The to-be-charged device may also be referred to as a receive device.

Optionally, the wireless charging device includes a housing, a wireless charging coil, a carrying apparatus, and the like. A charging surface for carrying the to-be-charged device may be disposed on a surface of the housing. Therefore, the to-be-charged device may be placed on the charging surface of the housing. In addition, in this embodiment, a battery and a circuit board are further disposed in the housing. The battery is configured to store electric energy and output the electric energy. A wireless charging circuit is disposed on the circuit board. The wireless charging circuit is electrically connected to the wireless charging coil and is configured to control a charging and discharging process of the wireless charging device and control an operation state of the entire wireless charging device.

The wireless charging coil is disposed in the housing and is configured to convert the electric energy of the battery into magnetic energy for transmission and emission. The carrying apparatus is disposed in the housing and is configured to carry and fasten the wireless charging coil and protect the wireless charging coil.

In this embodiment, how to monitor whether a charging environment is good when the to-be-charged device is charged based on an electromagnetic wave induction principle is to be resolved. In other words, whether a foreign object that affects charging quality exists in the wireless charging coil is monitored.

To resolve the problem, an embodiment may provide a method for determining a quality factor Q (or referred to as a "Q value"). The quality factor represents a ratio of power stored in a power storage device (such as an inductor or a capacitor) or a resonant circuit to a power loss in each cycle. A Q value of a reactance element in a series resonant loop is equal to a ratio of reactance of the reactance element to an equivalent series resistance of the reactance element. In addition, a larger Q value of the element indicates a smaller loss and better performance of a circuit or a network that includes the element. Therefore, the quality factor Q may be used for evaluating a magnitude of a loop loss. Generally, the Q value ranges from dozens to hundreds. In this embodiment, the Q value may be obtained through damped oscillation. A wireless charging circuit may obtain a resonant voltage attenuation waveform generated when the damped oscillation occurs in an LC series circuit, to determine the Q value.

A wireless charging circuit in a wireless charging device is described in detail in the following embodiment.

FIG. 1 is a schematic diagram of a structure of a wireless charging circuit according to an embodiment. The circuit includes an oscillation circuit 10 and a monitoring circuit 20. The oscillation circuit 10 includes a power supply 1001, a detection and control circuit 1002, and an LC series circuit 1003 that are sequentially connected. The monitoring circuit 20 includes a comparison module 2001 and a processing module 2002.

The power supply 1001 may be an excitation voltage source Us and is configured to provide a voltage for the oscillation circuit 10. The detection and control circuit 1002 is connected in series to the power supply 1001 and the LC series circuit 1003 and is configured to detect a voltage and control charging and discharging of the LC series circuit 1003. The detection and control circuit 1002 includes at least one switching transistor. The switching transistor includes a switch, a diode, a metal-oxide-semiconductor field-effect (MOSFET) transistor, an insulated gate bipolar transistor (IGBT), and the like, or the switching transistor may further include another material. The LC series circuit 1003 outputs a resonant voltage signal in a damped oscillation process, and the resonant voltage signal is output to the comparison module 2001 and the processing module 2002. The comparison module 2001 and the processing module 2002 perform sampling processing on the resonant voltage signal, calculate a Q value, and monitor a foreign object by using the Q value.

Further, the circuit components in the wireless charging circuit may include the following implementations.

Embodiment 1

Figure 2:
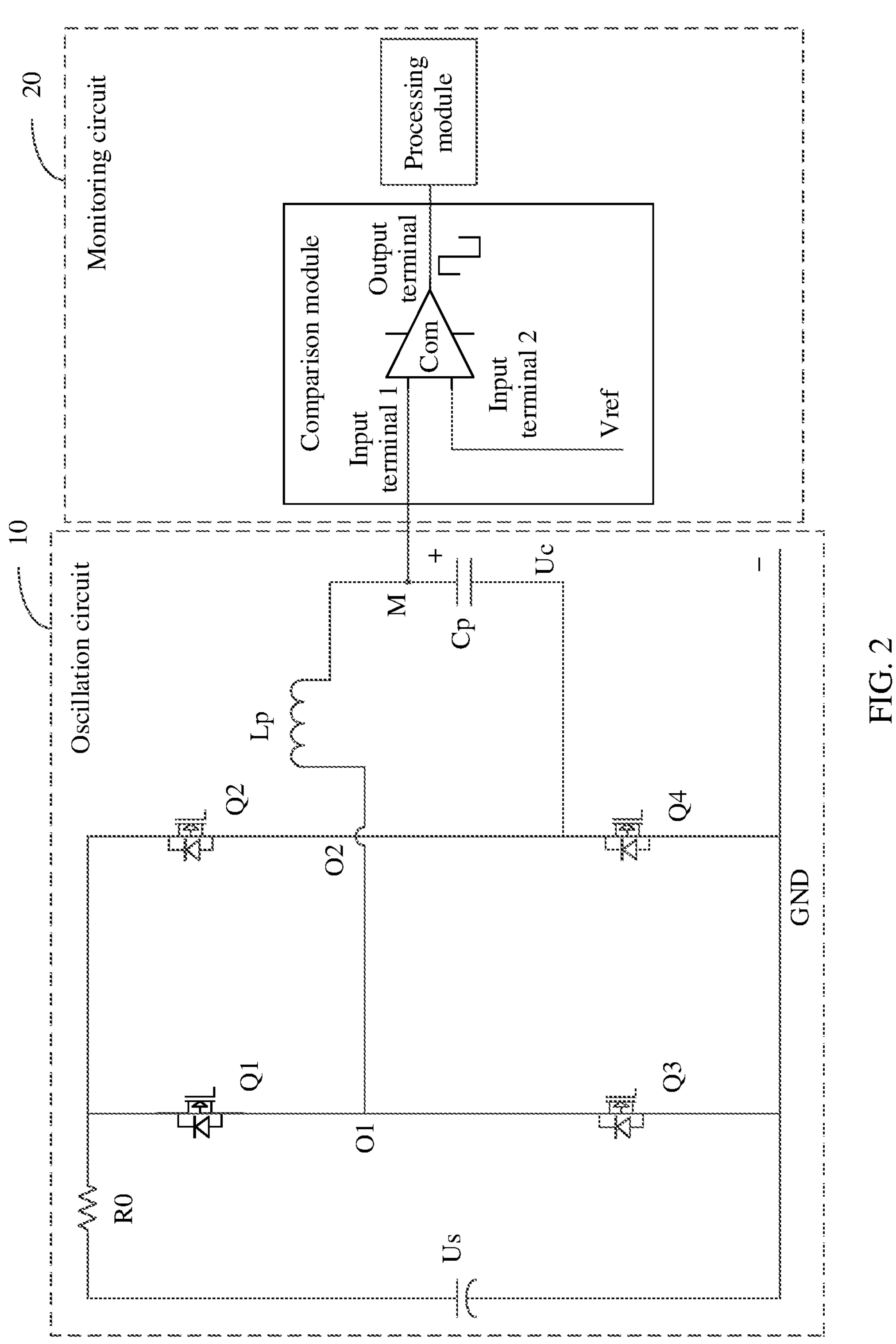
FIG. 2 is a schematic diagram of a structure of another wireless charging circuit according to an embodiment.

FIG. 2 is a schematic diagram of a structure of another wireless charging circuit according to an embodiment. The circuit includes an oscillation circuit 10 and a monitoring circuit 20. The oscillation circuit 10 is connected to the monitoring circuit 20. Further, the oscillation circuit 10 includes an excitation voltage source Us, a full-bridge circuit, an LC series circuit, and an equivalent impedance R of the LC series circuit. The equivalent impedance R is not shown in FIG. 2. A voltage amplitude of the excitation voltage source Us is $U_0$. In addition, the wireless charging circuit further includes a charging control resistor R0. The resistor R0 is configured to suppress oscillation of the circuit oscillation 10 when the LC series circuit is charged.

Figure 3:
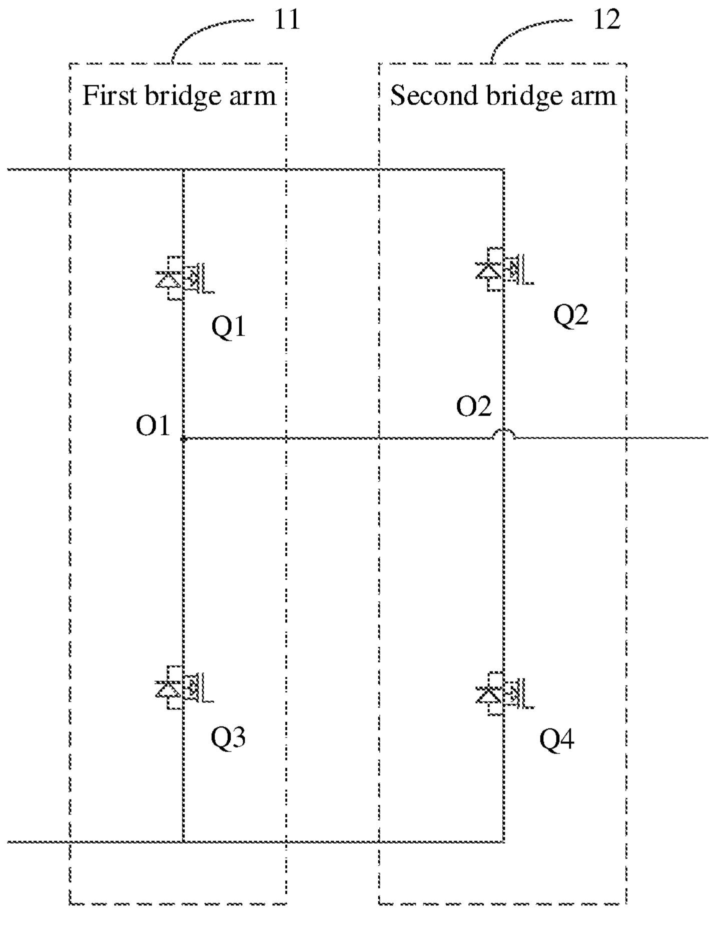
FIG. 3 is a schematic diagram of a structure of a full-bridge circuit according to an embodiment.

Further, as shown in FIG. 3, the full-bridge circuit includes a first bridge arm 11 and a second bridge arm 12 that are connected in parallel. The first bridge arm 11 includes a first switching transistor Q1 and a third switching transistor Q3. The second bridge arm 12 includes a second switching transistor Q2 and a fourth switching transistor Q4. In addition, Q1 is connected in series to Q3, and Q2 is connected in series to Q4. A phase midpoint of the first bridge arm 11 is O1, and a phase midpoint of the second bridge arm 12 is O2. Electric potentials at two terminals of the phase midpoint of each bridge arm are equal. One terminal of the full-bridge circuit is connected to a positive electrode of the excitation voltage source Us through the charging control resistor R0, and the other terminal is connected to a negative electrode of the excitation voltage source Us. The excitation voltage source Us is configured to provide a stable voltage for the LC series circuit.

It should be understood that a function of the detection and control circuit 1002 shown in FIG. 1 is implemented by the full-bridge circuit in this embodiment. The full-bridge circuit may be configured to control the excitation voltage source Us to charge the LC series circuit and control the LC series circuit to discharge.

As shown in FIG. 2, the LC series circuit includes an inductor Lp and a resonance capacitor Cp that are connected in series. The inductor Lp and the resonance capacitor Cp are connected in series. In addition, a phase midpoint of the inductor Lp and the resonance capacitor Cp is M. In addition, the LC series circuit further includes the equivalent impedance R. The equivalent impedance is not shown in FIG. 2. The LC series circuit is connected to the full-bridge circuit. The phase midpoint O1 of the first bridge arm of the full-bridge circuit is connected to one terminal of the LC series circuit, and the phase midpoint O2 of the second bridge arm of the full-bridge circuit is connected to the other terminal of the LC series circuit. A voltage of the phase midpoint M of the LC series circuit to ground (GND) is Uc. A pin that is output at the phase midpoint M is connected to the monitoring circuit 20.

The monitoring circuit 20 includes a comparison module and a processing module.

The comparison module includes a comparator. The comparator may be represented by "Corn". Further, the comparator Corn is a voltage comparator. The comparison module in this embodiment is described in an example of the comparator Corn.

The comparator includes a first input terminal (also referred to as an input terminal 1), a second input terminal (also referred to as an input terminal 2), and an output terminal. The input terminal 1 is a non-inverting input terminal +, and the input terminal 2 is an inverting input terminal −. In addition, the input terminal 1 is connected to the pin that is output at the phase midpoint M of the LC series circuit. The input terminal 2 is connected to a reference power supply. The reference power supply provides a reference voltage. The output terminal of the comparator is connected to the processing module.

The reference voltage may be represented as "Vref". The reference voltage may be a positive value or a negative value.

The comparator is configured to obtain a resonant voltage signal that is output when damped oscillation occurs in the oscillation circuit, convert the resonant voltage signal (namely, the voltage Uc of the phase midpoint M of the LC series circuit to ground) into a digital square wave signal, and transmit the digital square wave signal to the processing module.

The processing module is connected to the output terminal of the comparator, and is configured to receive the digital square wave signal output by the comparator, obtain a resonant voltage attenuation waveform during damped oscillation based on turn-on and turn-off of the switching transistors Q1 to Q4, obtain a first parameter that meets a first preset condition and that is in the resonant voltage attenuation waveform, determine a quality factor Q based on the first parameter, and monitor a foreign object based on the quality factor Q to obtain a monitoring result. The quality factor Q represents a ratio of power stored in the oscillation circuit to a power loss in each cycle. A larger Q value indicates a smaller loss and better charging effect.

The first preset condition is that in each oscillation cycle, a resonant voltage generated during damped oscillation is greater than the reference voltage. When the voltage of the phase midpoint M of the LC series circuit to ground reaches an amplitude voltage of the excitation voltage source Us, the damped oscillation occurs in the oscillation circuit to generate the resonant voltage.

In addition, the first parameter includes a quantity of peaks, a quantity of troughs, or a sum of the quantity of peaks and the quantity of troughs. In addition, the first parameter may further include other parameters. There may be the following three implementations.

Figure 4A:
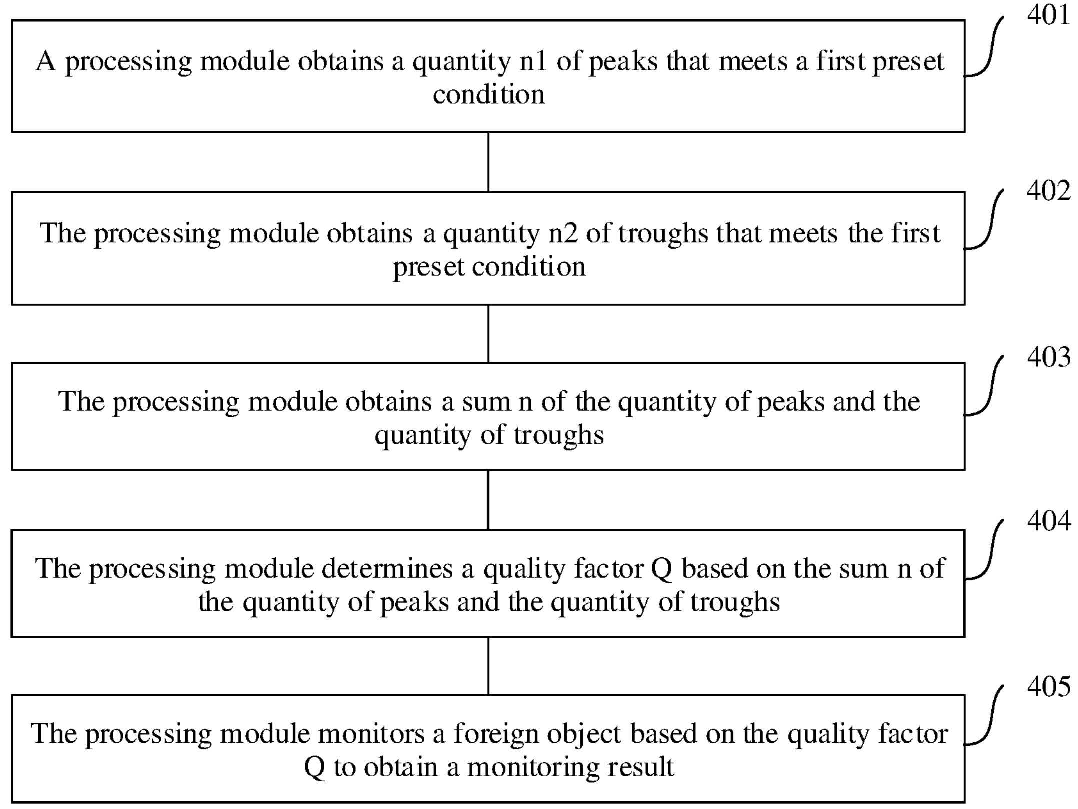
FIG. 4*a* is a flowchart of a method for determining a Q value according to an embodiment.

In a first possible implementation, the first parameter is the quantity of peaks. As shown in FIG. 4*a*, the method includes the following steps.

401: The processing module obtains the quantity of peaks that meets the first preset condition. The quantity of peaks is represented as "n1".

Figure 4B:
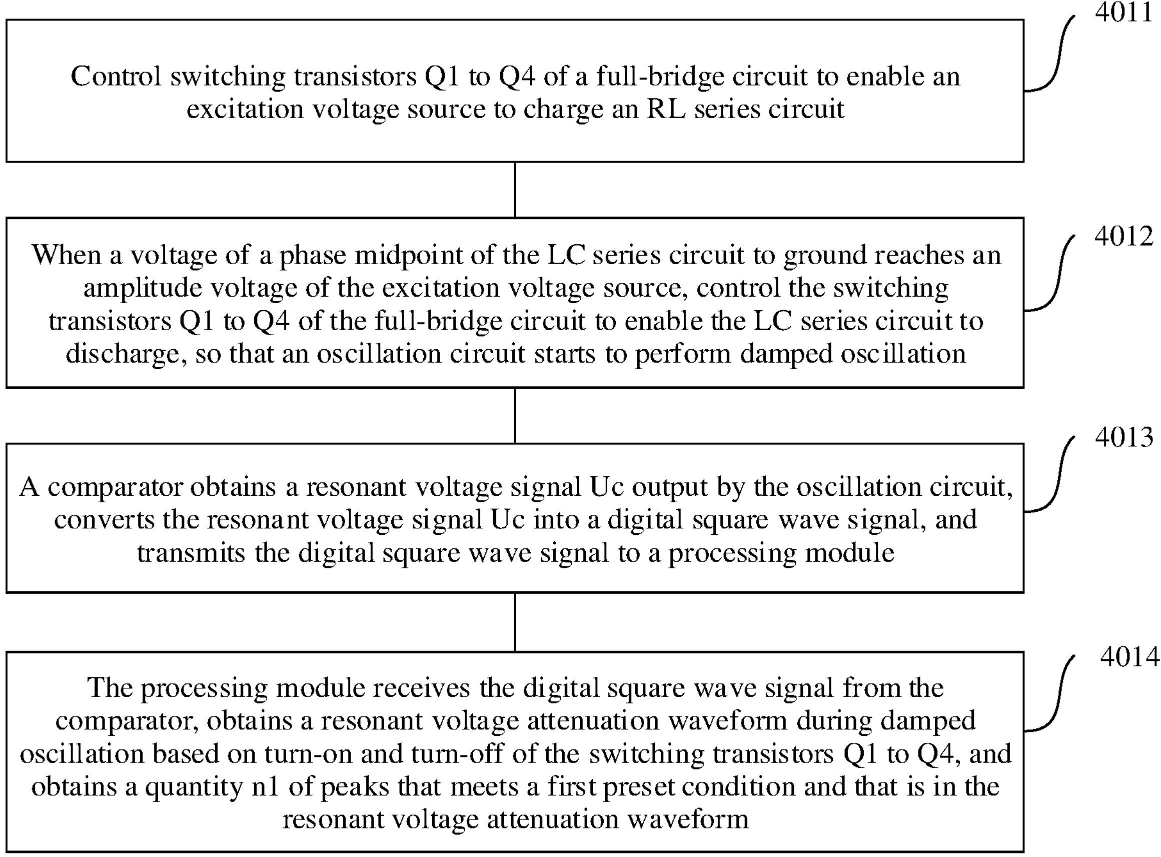
FIG. 4*b* is a flowchart of a method for determining a quantity of peaks according to an embodiment.

Either the switching transistor Q1 or the switching transistor Q3 of the first bridge arm of the full-bridge circuit is turned on. Similarly, either the switching transistor Q2 or the switching transistor Q4 of the second bridge arm is turned on. Further, as shown in FIG. 4*b*, step 401 includes the following steps.

4011: Control the switching transistors Q1 to Q4 of the full-bridge circuit to enable the excitation voltage source Us to charge the LC series circuit.

The first switching transistor Q1 of the first bridge arm may be controlled to be turned off and the third switching transistor Q3 may be controlled to be turned on. In addition, the second switching transistor Q2 of the second bridge arm is controlled to be turned on and the fourth switching transistor Q4 is controlled to be turned off. In this case, the oscillation circuit forms a first loop: Us→Q2→Cp→Lp→Q3→Ground (GND)→Us, and the excitation voltage source Us charges the capacitor Cp.

4012: When the voltage of the phase midpoint M of the LC series circuit to ground reaches an amplitude voltage $U_0$ of the excitation voltage source Us, control the switching transistors Q1 to Q4 of the full-bridge circuit to enable the LC series circuit to discharge, so that the oscillation circuit starts to perform the damped oscillation.

When the voltage Uc of the phase midpoint M of the LC series circuit to ground is the amplitude voltage $U_0$, the second switching transistor Q2 of the second bridge arm is controlled to be turned off and the fourth switching transistor Q4 is controlled to be turned on, and states of the first switching transistor Q1 and the third switching transistor Q3 of the first bridge arm are kept unchanged. In this case, the oscillation circuit forms a second loop: GND→Q3→Lp→Cp→Q4→GND, and the capacitor Cp of the LC series circuit discharges.

Figure 5A:
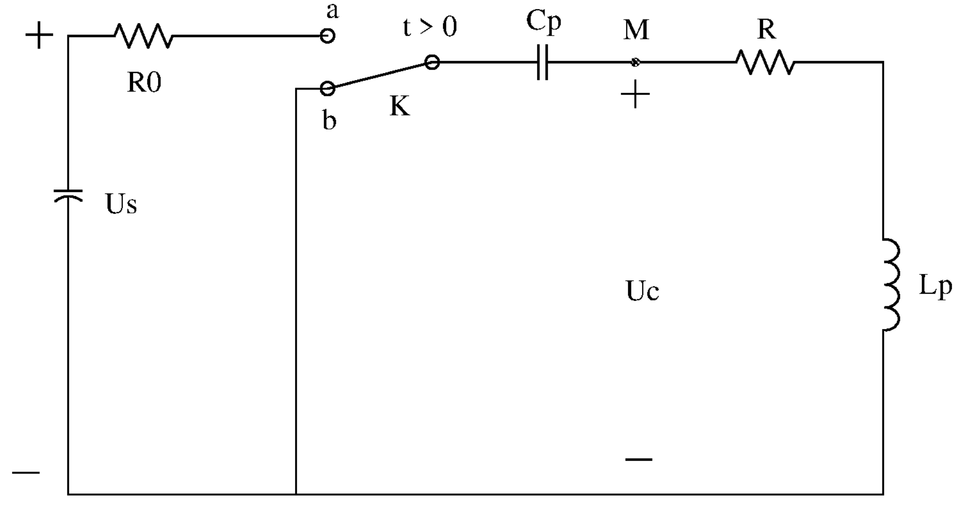
FIG. 5*a* is an equivalent circuit diagram of a resonant circuit according to an embodiment.

An equivalent circuit is shown in FIG. 5*a*. Controlling Q3 to be turned on, Q4 to be turned on, and Q2 to be turned off is equivalent to thumbing a switch K of the equivalent circuit from a contact a to a contact b (t>0) to form the second loop. The LC series circuit outputs the resonant voltage Uc to the comparator. The resonant voltage starts to attenuate from the amplitude voltage $U_0$.

Step 4011 and step 4012 may be performed by a control circuit connected to the switching transistors Q1 to Q4. For example, the switching transistors Q1 to Q4 are all MOSFET transistors, and the control circuit is connected to a gate of each MOSFET transistor and configured to drive the switching transistors Q1 to Q4 to be turned on or off.

4013: The comparator obtains the resonant voltage signal Uc output by the oscillation circuit, converts the resonant voltage signal Uc into a digital square wave signal, and transmits the digital square wave signal to the processing module.

The comparator is configured to compare a value of the resonant voltage signal output by the oscillation circuit in each oscillation cycle with a value of the reference voltage. Whether the resonant voltage Uc generated during damped oscillation is greater than the reference voltage Vref in each oscillation cycle is further determined. If yes, the first preset condition is met; otherwise, the first preset condition is not met.

Figure 5B:
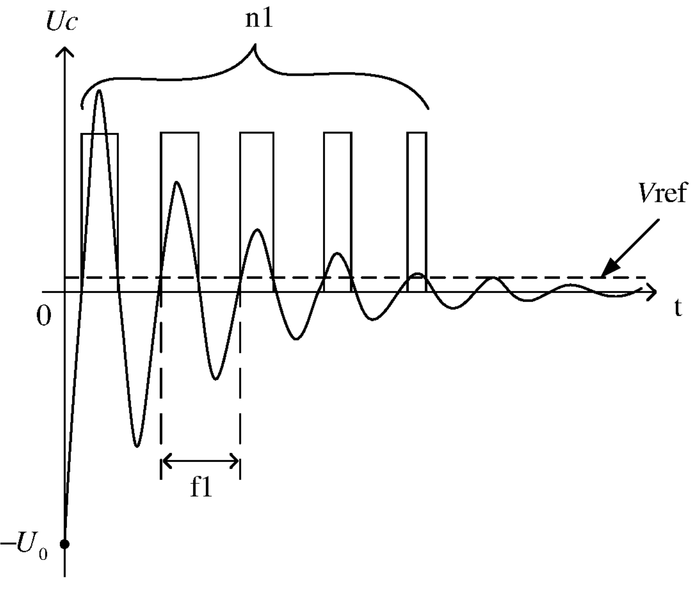
FIG. 5*b* is a schematic diagram of an attenuation waveform of a resonant voltage generated by an oscillation circuit according to an embodiment.

FIG. 5*b* is a schematic diagram of the attenuation waveform of the resonant voltage generated by the oscillation circuit. The excitation voltage source Us generates a first-order step excitation signal e(t). After the attenuation waveform of the resonant voltage output by the oscillation circuit of the excitation voltage source Us passes through the comparator, the output resonant voltage Uc gradually attenuates. In FIG. 5*b*, a wavy line represents a resonant voltage attenuation curve, and a square wave line represents the digital square wave signal obtained through the conversion. A frequency of the oscillation cycles is f1. In each oscillation cycle (1/f1), if the output resonant voltage Uc generated during damped oscillation is greater than Vref, Vref is a direct current level. In this embodiment, it is assumed that the direct current level is a positive level, a square wave signal is generated, and a rising edge of a square wave appears. A start moment of the rising edge is an intersection point of the resonant voltage attenuation curve and the reference voltage. If Uc≤Vref, no square wave signal is generated, and the damped oscillation tends to end. A quantity of peaks that meets the first preset condition and that is in the resonant voltage attenuation curve is the same as a quantity of rising edges in the square wave.

4014: The processing module receives the digital square wave signal from the comparator, obtains the resonant voltage attenuation waveform during damped oscillation based on the turn-on and turn-off of the switching transistors Q1 to Q4, and obtains a quantity n1 of peaks that meets the first preset condition and that is in the resonant voltage attenuation waveform.

During the damped oscillation of the oscillation circuit, the resonant voltage Uc output by the LC series circuit gradually decreases from the amplitude voltage $U_0$ to 0. The processing module determines the quantity n1 of peaks based on the digital square wave signal output by the comparator, where n1 is the same as the quantity of rising edges in the square wave. In the example shown in FIG. 5*b*, the quantity of peaks that meets the first preset condition is 5. In other words, n1=5.

In a second possible implementation, the first parameter is the quantity of troughs. As shown in FIG. 4*a*, the method includes the following steps.

402: The processing module obtains the quantity of troughs that meets the first preset condition. The quantity of troughs is represented as "n2".

A method for obtaining the quantity n2 of troughs is similar to a method for obtaining the quantity n1 of peaks in step 401. The method may include the following steps.

First: Control the switching transistors Q1 to Q4 of the full-bridge circuit to enable the excitation voltage source Us to charge the LC series circuit.

The first switching transistor Q1 of the first bridge arm is controlled to be turned on and the third switching transistor Q3 is controlled to be turned off. In addition, the second switching transistor Q2 of the second bridge arm is controlled to be turned off and the fourth switching transistor Q4 is controlled to be turned on. In this case, the oscillation circuit forms a third loop: Us→*Q1→*Lp→*Cp→*Q4→*GND→*Us, and the excitation voltage source Us charges the capacitor Cp.

Second: When the voltage Uc of the phase midpoint of the LC series circuit to ground reaches an amplitude voltage $U_0$ of the excitation voltage source Us, control the switching transistors Q1 to Q4 of the full-bridge circuit to enable the LC series circuit to discharge, so that the oscillation circuit starts to perform the damped oscillation. When the resonant voltage signal Uc is the amplitude voltage $U_0$, the third switching transistor Q3 of the first bridge arm is controlled to be turned on and the first switching transistor Q1 is controlled to be turned off. In addition, the second switching transistor Q2 of the second bridge arm is kept off and the fourth switching transistor Q4 is kept on. In this case, the oscillation circuit forms a fourth loop: GND→Q3→Lp→Cp→Q4→GND, and the capacitor Cp of the LC series circuit discharges.

Figure 6A:
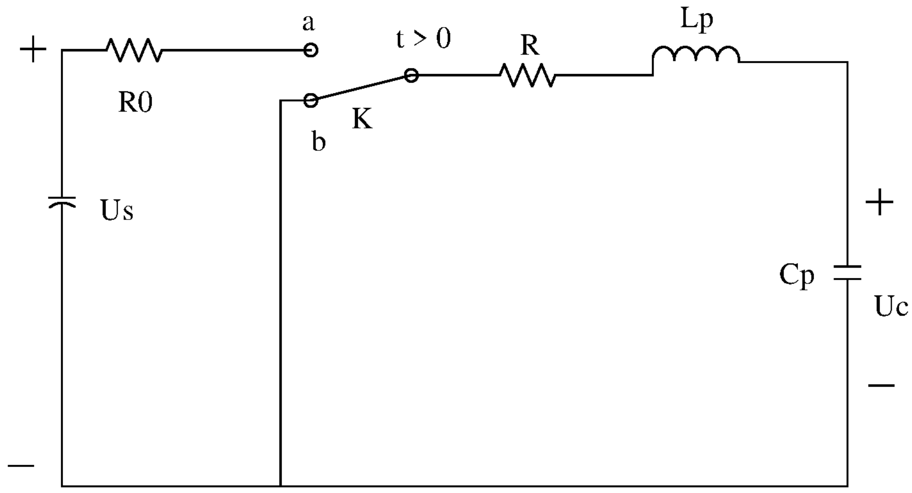
FIG. 6*a* is an equivalent circuit diagram of another resonant circuit according to an embodiment.

An equivalent circuit is shown in FIG. 6*a*. Controlling Q3 to be turned on, Q4 to be turned on, Q1 to be turned off, and Q2 to be turned off is equivalent to thumbing a switch K of the equivalent circuit from a contact a to a contact b (t>0) to form the fourth loop. The LC series circuit outputs the resonant voltage signal Uc to the comparator.

Third: The comparator obtains the resonant voltage signal Uc output by the oscillation circuit, converts the resonant voltage signal Uc into a digital square wave signal, and transmits the digital square wave signal to the processing module.

Figure 6B:
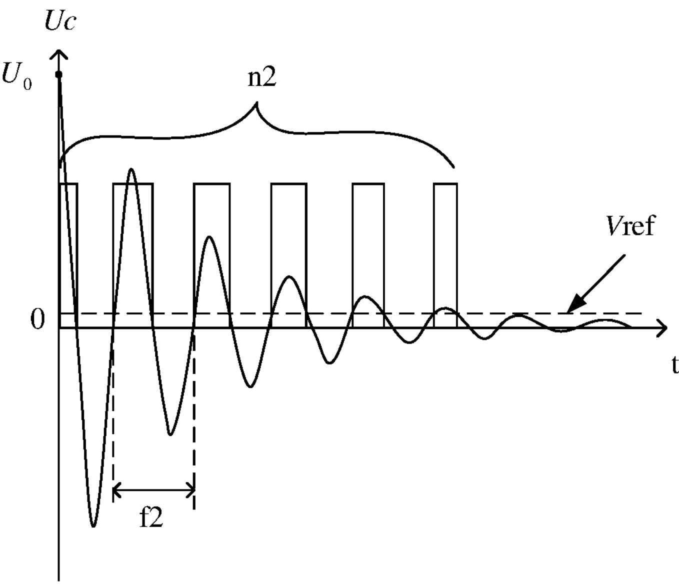
FIG. 6*b* is a schematic diagram of another attenuation waveform of a resonant voltage generated by an oscillation circuit according to an embodiment.

The comparator is configured to compare a value of the voltage signal Uc output by the oscillation circuit in each oscillation cycle with a value of the reference voltage Vref. FIG. 6*b* is a schematic diagram of the attenuation waveform of the resonant voltage output by the oscillation circuit. The excitation voltage source Us generates a first-order step excitation signal e(t). After an attenuation oscillation signal of the LC oscillation circuit of the excitation voltage source Us passes through the voltage comparator, the output voltage gradually attenuates. In FIG. 6*b*, a wavy line represents a curve of the resonant voltage attenuation waveform, this waveform and the waveform shown in FIG. 5*b* are symmetrical relative to a horizontal axis, and a square wave line represents the digital square wave signal obtained through conversion. A frequency of the oscillation cycles is f2. In each oscillation cycle (1/f2), if the resonant voltage Uc generated by the damped oscillation is greater than Vref, a square wave signal is generated, and a rising edge of a square wave appears. If Uc≤Vref, no square wave signal is generated, and the damped oscillation tends to end. A quantity of peaks that meets the first preset condition and that is in the waveform shown in FIG. 6*b* is equivalent to a quantity of troughs in the attenuation waveform shown in FIG. 5*b*. The quantity of troughs is the same as a quantity of rising edges in the square wave.

Fourth: The processing module receives the digital square wave signal from the comparator and determines the quantity n2 of troughs based on the digital square wave signal. In the example shown in FIG. 6*b*, the quantity of troughs that meets the first preset condition is 6. In other words, n2=6. The corresponding oscillation frequency is f2.

In a third possible implementation, the first parameter is the sum of the quantity of peaks and the quantity of troughs. As shown in FIG. 4*a*, the method includes the following steps.

403: The processing module obtains the sum of the quantity of peaks and the quantity of troughs. The sum (or referred to as a total quantity) may be represented as n.

The sum of the quantity of peaks and the quantity of troughs is n=n1+n2, and the oscillation frequency is f≈f1≈f2. Further, for a process of obtaining the quantity n1 of peaks, refer to detailed descriptions of step 401. For a process of obtaining the quantity n2 of troughs, refer to detailed descriptions of step 402. Details are not described herein again.

It should be understood that if the first parameter further includes other parameters, the first parameter may further include a process of obtaining these parameters.

404: The processing module determines the quality factor Q based on the sum n (the first parameter) of the quantity of peaks and the quantity of troughs.

As shown in FIG. 6*a*, before K acts, namely at a moment t≤0, an input source of the LC series circuit is the excitation voltage source Us, an output direct current voltage amplitude of the excitation voltage source Us is $U_0$, and a voltage of the fully charged capacitor Cp is $U_0$.

After K acts, t>0, and a voltage value of the LC input source jumps down to 0 From $U_0$, a voltage u(t) of the capacitor Cp starts to attenuate in a free-run manner. A free-run equation is:

$$\frac{d^2u}{d^2t}+\frac{R}{L}\cdot\frac{du}{dt}+\frac{1}{LC}u=0. \tag{1}$$

The foregoing second-order differential equation (1) is solved.

When $$\frac{1}{LC}>\left(\frac{R}{2L}\right)^2,$$

namely when Q>½, based on an initial condition:

$$\begin{cases} u(0^+)=u(0^-)=U_0 \\ i(0^+)=i(0^-)=0 \end{cases}, \tag{2}$$

-continued $$u(t)=\frac{U_0}{\omega/\omega_0}\cdot e^{-\frac{\omega_0}{2Q}t}\sin\left(\omega t+\sin^{-1}\frac{\omega}{\omega_0}\right) \tag{3}$$

is solved, where the quality factor Q (referred to as the Q value) of a resonant circuit is defined as:

$$Q=\frac{\omega_0 L}{R}=\frac{1}{\omega_0 CR}=\frac{1}{R}\sqrt{\frac{L}{C}}. \tag{4}$$

A resonance occurrence condition is:

$$X(j\omega_0)=\omega_0 L-\frac{1}{\omega_0 C}=0,\text{ where} \tag{5}$$

$$\omega_0=\frac{1}{\sqrt{LC}},\ f_0=\frac{1}{2\pi\sqrt{LC}},$$

$\omega_0$ is an angular frequency, and $f_0$ is a frequency.

$$\omega=\sqrt{\frac{1}{LC}-\left(\frac{R}{2L}\right)^2}=\omega_0\sqrt{1-\left(\frac{1}{2Q}\right)^2}. \tag{6}$$

When the equivalent impedance R is small enough, namely when Q is large enough, $\omega\approx\omega_0$, namely $$\sin^{-1}\frac{\omega}{\omega_0}\approx\frac{\pi}{2}$$

in the equation (3), to obtain:

$$u(t)=U_0\cdot e^{-\frac{\omega_0}{2Q}t}\cos\omega_0 t. \tag{7}$$

$$t=n\cdot\frac{\pi}{\omega_0},$$

namely $$t=n\cdot\frac{T_0}{2},$$

may be substituted into the equation (7) to obtain:

$$u(t)=U_0\cdot e^{-\frac{\omega_0}{2Q}t}\cos\omega_0\cdot n\cdot\frac{\pi}{\omega_0}=U_0\cdot e^{-\frac{\omega_0}{2Q}t}\cos n\pi. \tag{8}$$

When n is a natural number, namely when n≥0, the foregoing equation (8) is $$u(t)=(-1)^n U_0\cdot e^{-\frac{\omega_0}{2Q}t}.$$

When n is an odd number, u(t) is a negative peak value. When n is an even number, u(t) is a positive peak value. Peak or trough voltages corresponding to any two peak moments t1 and t2 are selected as U1 and U2, where t1 and t2 are moments of any two peaks or troughs in the resonant voltage attenuation waveform.

For example, t1 is a peak moment of the oscillation waveform, and t2 is another peak moment of the oscillation waveform; t1 is a peak moment of the oscillation waveform, and t2 is a trough moment of the oscillation waveform; t1 is a trough moment of the oscillation waveform, and t2 is another peak moment of the oscillation waveform; or t1 is a trough moment of the oscillation waveform, and t2 is another trough moment of the oscillation waveform.

In this case, $$\begin{cases} U1 = U_0 \cdot e^{-\frac{\omega_0}{2Q}t_1} \\ U2 = U_0 \cdot e^{\frac{\omega_0}{2Q}t_2} \end{cases}. \tag{9}$$

Therefore, $$\left|\frac{U1}{U2}\right| = e^{\frac{\omega_0}{2Q}(t_2-t_1)}. \tag{10}$$

Logarithms are taken on two sides of the equation (10) to obtain:

$$\begin{aligned} Q &= \frac{\omega_0(t_2-t_1)}{2\cdot\ln\left(\left|\frac{U1}{U2}\right|\right)} = \frac{\omega_0(t_2-t_1)\cdot\pi}{2\pi\cdot\ln\left(\left|\frac{U1}{U2}\right|\right)} = \frac{(t_2-t_1)\cdot\pi}{\frac{T_0}{m}\cdot m\cdot\ln\left(\left|\frac{U1}{U2}\right|\right)} \\ &= \frac{(t_2-t_1)}{\frac{T_0}{m}}\cdot\frac{\pi}{m\cdot\ln\left(\left|\frac{U1}{U2}\right|\right)} \\ &= n\cdot\frac{\pi}{m\cdot\ln\left(\left|\frac{U1}{U2}\right|\right)} \end{aligned}$$

$$Q = \frac{n\cdot\pi}{m\cdot\ln\left(\left|\frac{U1}{U2}\right|\right)}, \tag{11}$$

where m and n are both positive integers, m≥1, $$n = \frac{(t_2-t_1)}{\frac{T_0}{m}},$$

Q is the quality factor, the moment corresponding to the peak or trough voltage U1 of the oscillation waveform is t1, and the moment corresponding to the peak or trough voltage U2 of the oscillation waveform is t2, and U1 or U2 is a negative value if being a trough voltage and is a positive value if being a peak voltage. In addition, when the Q value is specific, n is proportional to m, and n is inversely proportional to 1/m.

405: The processing module monitors the foreign object based on the quality factor Q to obtain the monitoring result.

A monitoring method may set two thresholds: a first threshold and a second threshold. The first threshold is less than the second threshold. The monitoring result is obtained based on the Q value obtained in the foregoing step when the following condition is met.

If the quality factor Q is less than or equal to the first threshold, it is determined that the foreign object exists in a wireless charging coil.

If the quality factor Q is greater than the first threshold and is less than or equal to the second threshold, the foreign object may exist in a wireless charging coil and may need to be further inspected.

If the quality factor Q is greater than the second threshold, it is determined that no foreign object exists in a wireless charging coil.

Further, in the foregoing three possible implementations of the first parameter, the first parameter includes the quantity n1 of peaks or the quantity n2 of troughs. In other words, n=n1 or n=n2. In this case, m=1. Based on the foregoing equation (11), the Q value is:

$$Q = \frac{n1\cdot\pi}{\ln(|U1/U2|)} \text{ or } Q = \frac{n2\cdot\pi}{\ln(|U1/U2|)}. \tag{12}$$

Alternatively, the first parameter includes the sum of the quantity of peaks and the quantity of troughs. In other words, n=n1+n2. In this case, m=2. Based on the foregoing equation (11), the Q value is:

$$Q = \frac{n\cdot\pi}{2\cdot\ln(|U1/U2|)} = \frac{(n1+n2)\cdot\pi}{2\ln(|U1/U2|)}. \tag{13}$$

In addition, it can be understood from the equation (11) that because $$Q = \frac{n\cdot\pi}{m\cdot\ln(|U1/U2|)} \text{ and } k = \frac{\pi}{m\cdot\ln(|U1/U2|)},\ Q = n\cdot k.$$

In this case, accuracy of Q is limited by a step value k. A smaller value of k indicates a larger value of m and higher accuracy of Q.

In the foregoing third implementation, it can be understood from the equation (8) that $$\Delta t = (t_2 - t_1) = n\cdot\frac{T_0}{2},$$

namely $$m = \frac{n\cdot T_0}{t_2-t_1} = 2,$$

to obtain the equation (13), $$Q = \frac{n\cdot\pi}{2\cdot\ln(|U1/U2|)},$$

the accuracy is $$k = \frac{\pi}{2\cdot\ln(|U1/U2|)},$$

and n=n1+n2.

In the method provided in this embodiment, the value of m is 2. Compared with the case in which the value of m is 1, this case doubles a quantity of sampled peaks, and halves a measurement step unit under the specific Q value, to double accuracy of the Q value and enhance a capability of identifying the foreign object. For example, when the value of m is 1, possible measurement accuracy is 1. When the value of m is 2, obtained measurement accuracy is 0.5. In this way, the measurement step unit of the Q value is changed from an original integer to half of the integer. Because the step unit is reduced, a measurement result is more accurate, and whether the foreign object exists in the coil can be more accurately determined, to improve measurement accuracy.

It should be understood that the first parameter may further include other parameters, so that the value of m is greater than 2, to obtain the smaller measurement accuracy unit and the more accurate measurement result.

In this method, the full-bridge circuit outputs the output voltage of the LC series circuit and calculates the Q value based on the quantity of peaks, the quantity of troughs, or the sum of the quantity of peaks and the quantity of troughs, to monitor the foreign object in the charging coil.

Embodiment 2

This embodiment provides another wireless charging circuit. The wireless charging circuit is similar to Embodiment 1 in structure except that in this embodiment, the full-bridge circuit of the oscillation circuit 10 is replaced with a half-bridge circuit, and a voltage biasing module is added to the monitoring circuit. In addition, the comparison module includes two or more comparators. Further, the two or more comparators are also referred to as integrated voltage comparators.

Figure 7:
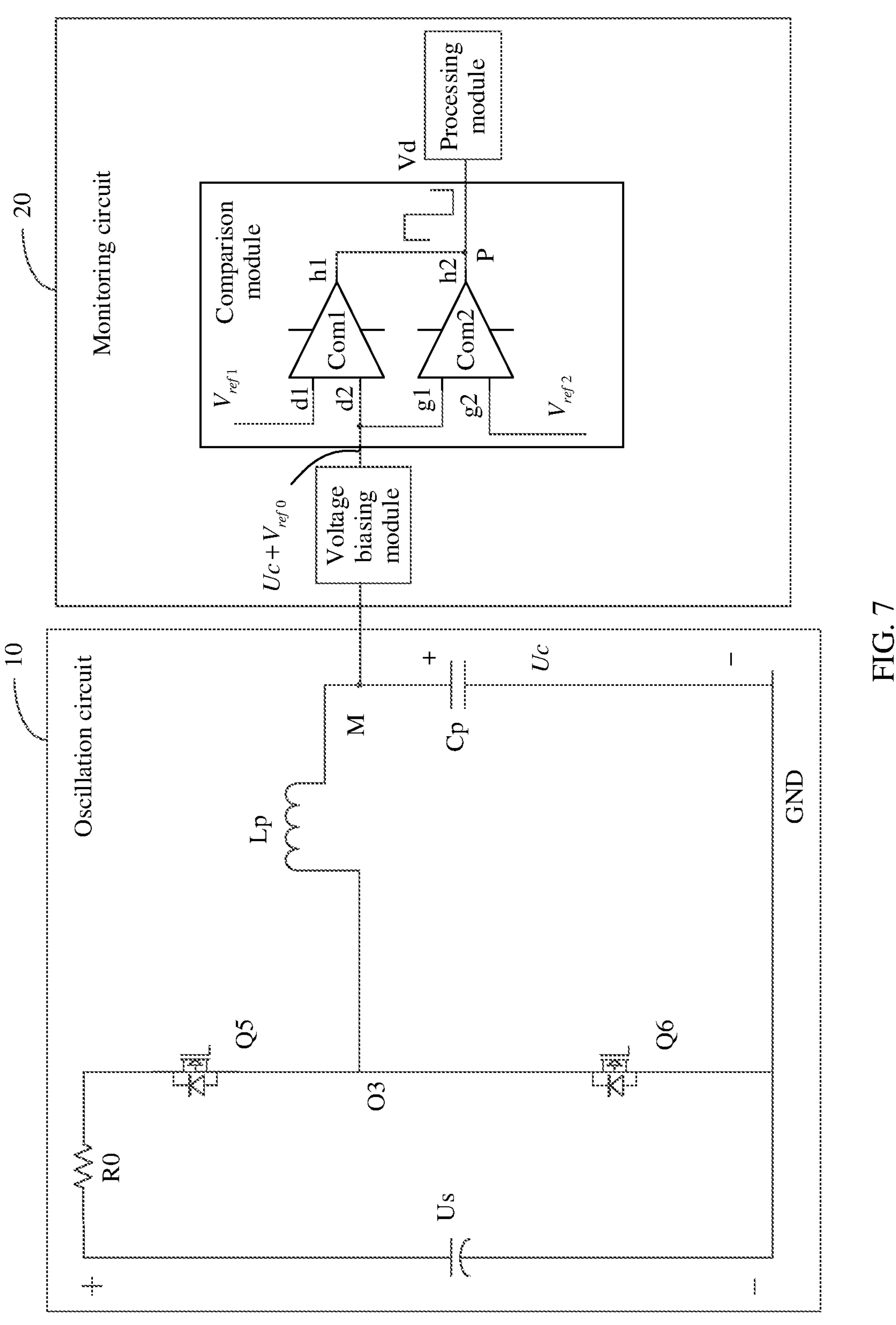
FIG. 7 is a schematic diagram of a structure of another wireless charging circuit according to an embodiment.

As shown in FIG. 7, the wireless charging circuit includes an oscillation circuit 10 and a monitoring circuit 20. Further, the oscillation circuit 10 includes an excitation voltage source U.S. Ser. No. the half-bridge circuit, an LC series circuit, and an equivalent impedance R of the LC series circuit. The equivalent resistance R is not shown in FIG. 7. $U_0$ is a voltage amplitude of the excitation voltage source Us with a variable frequency. In addition, the wireless charging circuit further includes a charging control resistor R0 configured to suppress oscillation of the circuit oscillation 10 when the LC series circuit is charged.

Further, the half-bridge circuit includes a fifth switching transistor Q5 and a sixth switching transistor Q6. In addition, Q5 is connected in series to Q6. A phase midpoint of the half-bridge circuit is O3. One terminal of the half-bridge circuit is connected to the charging control resistor R0, and the other terminal is connected to a negative electrode of the excitation voltage source Us.

One terminal of the LC series circuit is connected to the phase midpoint O3 of the half-bridge circuit, and the other terminal is connected to the ground. The LC series circuit includes an inductor Lp and a resonance capacitor Cp. In addition, a phase midpoint of the inductor Lp and the resonance capacitor Cp is M. In addition, the LC series circuit further includes the equivalent impedance R.

The phase midpoint M of the LC series circuit is connected to the monitoring circuit 20 and is configured to output a resonant voltage signal generated during damped oscillation to the monitoring circuit 20. The resonant voltage signal is also referred to as a voltage of the phase midpoint M of the LC series circuit to ground.

The monitoring circuit 20 includes a voltage biasing module, a comparison module, and a processing module. The voltage biasing module is connected to the oscillation circuit and is configured to receive the resonant voltage signal output by the oscillation circuit, bias the resonant voltage signal, and transmit a biased resonant voltage signal to the comparison module. The comparison module is configured to receive the biased resonant voltage signal, convert the output biased resonant voltage signal into a digital square wave signal, and output the digital square wave signal to the processing module.

After a resonant voltage signal Uc is processed by the voltage biasing module, a biased resonant voltage $UC+V_{ref\,0}$ is output, where $V_{ref\,0}$ is a bias voltage.

An output terminal of the comparison module is connected to the processing module. Further, the comparison module includes a first comparator (which may be represented as "Com1") and a second comparator (which may be represented as "Com2"). Com1 includes an input terminal d1, an input terminal d2, and an output terminal h1. Com2 includes an input terminal g1, an input terminal g2, and an output terminal h2. The phase midpoint M of the LC series circuit is connected to the input terminal d2 of Com1 and the input terminal g1 of Com2 through the voltage biasing module. The input terminal d1 is connected to a first voltage source. The input terminal g2 is connected to a second voltage source. The output terminal h1 of Com1 is connected to the output terminal h2 of Com2, and a connection point is P.

The first voltage source is configured to provide a first reference voltage $V_{ref\,1}$ for Com1. The second voltage source is configured to provide a second reference voltage $V_{ref\,2}$ for Com2. The input terminals d1 and g1 are non-inverting input terminals +, and the input terminals d2 and g2 are inverting input terminals −. The comparison module is configured to determine whether the biased resonant voltage $UC+V_{ref\,0}$ is between the first reference voltage $V_{ref\,1}$ and the second reference voltage $V_{ref\,2}$. If yes, $V_{ref\,2} \leq Uc+V_{ref\,2} \leq V_{ref\,1}$. In this case, an output voltage is a low level. Otherwise, the output voltage is a high level. A square wave signal is generated when the high level is output, and a rising edge is formed. The comparison module transmits the generated digital square wave signal to the processing module.

When the voltage Uc of the phase midpoint M of the LC series circuit to ground reaches the amplitude voltage $U_0$ of the excitation voltage source Us, the damped oscillation occurs in the oscillation circuit to generate a resonant voltage. The resonant voltage is biased by the voltage biasing module to obtain the resonant voltage $UC+V_{ref\,0}$, where Uc is the resonant voltage generated during damped oscillation, and $V_{ref\,0}$ is the bias voltage. A second preset condition is $Uc+V_{ref\,0}>V_{ref\,1}$ or $UC+V_{ref\,0}<V_{ref\,2}$ where $V_{ref\,1}$ is the first reference voltage, and $V_{ref\,2}$ is the second reference voltage.

The processing module receives the digital square wave signal output by the comparison module, obtains a resonant voltage attenuation waveform during damped oscillation based on turn-on and turn-off of switching transistors Q1 to Q4, obtains a second parameter that meets the second preset condition and that is in the resonant voltage attenuation waveform, determines a Q value based on the second parameter, and monitors a foreign object based on a quality factor Q to obtain a monitoring result. The second parameter includes a sum of a quantity of peaks and a quantity of troughs.

Figure 8:
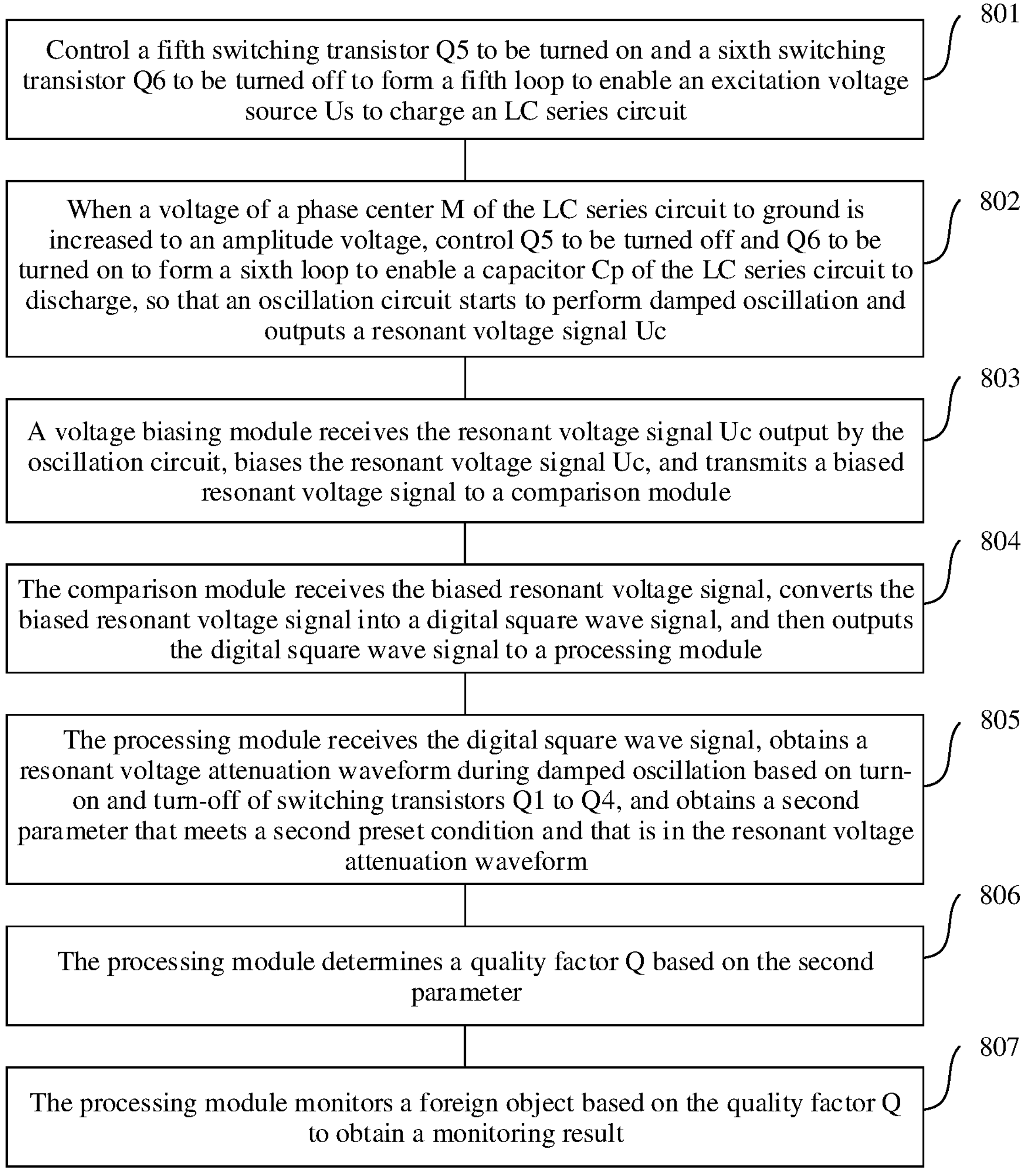
FIG. 8 is a flowchart of another method for determining a Q value according to an embodiment.

As shown in FIG. 8, a method for determining, by the processing module, the Q value based on the second parameter includes the following steps.

801: Control the fifth switching transistor Q5 to be turned on and the sixth switching transistor Q6 to be turned off to form a fifth loop: Us→Q5→Lp→Cp→GND→Us to enable the excitation voltage source Us to charge the LC series circuit.

802: When the voltage of the phase center M of the LC series circuit to ground is increased to the amplitude voltage $U_0$, control Q5 to be turned off and Q6 to be turned on. In this case, the oscillation circuit forms a sixth loop: GND→Q6→Lp→Cp→GND, and the capacitor Cp of the LC series circuit discharges, so that the oscillation circuit starts to perform the damped oscillation and outputs the resonant voltage signal Uc. The resonant voltage signal Uc starts to attenuate from $U_0$. An equivalent circuit is shown in FIG. 5*a*. Enabling Q6 to be turned on and Q5 to be turned off at a moment t=0 is equivalent to thumbing a switch K of the equivalent circuit from a contact a to a contact b to form the sixth loop. The LC series circuit outputs the resonant voltage signal Uc to the voltage biasing module of the monitoring circuit.

803: The voltage biasing module receives the resonant voltage signal output by the oscillation circuit, biases the resonant voltage signal, and transmits a biased resonant voltage signal to the comparison module.

804: The comparison module receives the biased resonant voltage signal, converts the biased resonant voltage signal into a digital square wave signal, and outputs the digital square wave signal to the processing module.

805: The processing module receives the digital square wave signal, obtains the resonant voltage attenuation waveform during damped oscillation based on the turn-on and turn-off of the switching transistors Q1 to Q4, and obtains the second parameter that meets the second preset condition and that is in the resonant voltage attenuation waveform. The second parameter includes the sum of the quantity of peaks and the quantity of troughs.

Figure 9:
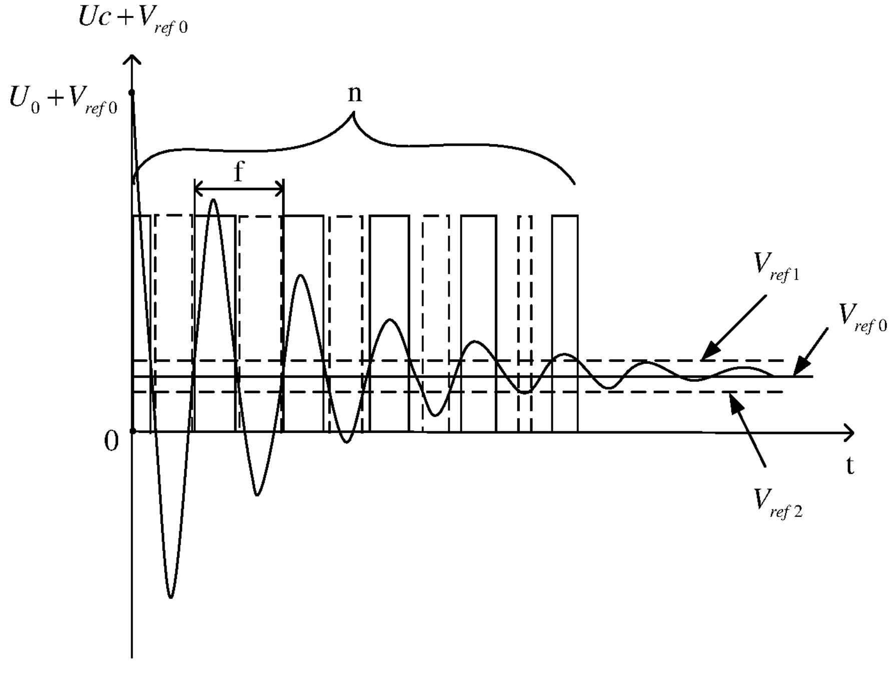
FIG. 9 is a schematic diagram of still another attenuation waveform of a resonant voltage generated by an oscillation circuit according to an embodiment.

FIG. 9 is a schematic diagram of an attenuation waveform of a resonant voltage Uc in an oscillation circuit. $V_{ref\,0}$ is the bias voltage, $V_{ref\,1}$ is the first reference voltage, $V_{ref\,2}$ is the second reference voltage, and $U_0+V_{ref\,0}$ represents a voltage that is output after the amplitude voltage $U_0$ generated by the oscillation circuit is processed by using the bias voltage $V_{ref\,0}$. Uc is the voltage of the phase midpoint M of the LC series circuit to ground and is also referred to as the resonant voltage. A maximum amplitude of the resonant voltage is $U_0$. In addition, a voltage difference between the bias voltage and each of the first reference voltage and the second reference voltage satisfies $\Delta V=V_{ref\,1}-V_{ref\,0}=V_{ref\,0}-V_{ref\,2}$, where f is a resonant frequency.

In each half cycle, if the second preset condition is met, namely if $Uc+V_{ref\,0}>V_{ref\,1}$, a high level is output, and a rising edge is generated. A start moment of the rising edge is an intersection point of the biased resonant voltage and the first reference voltage $V_{ref\,1}$. As shown in FIG. 9, a square wave signal with a solid line is generated. If $Uc+V_{ref\,0}<V_{ref\,2}$, a high level is output, and a rising edge is generated. A start moment of the rising edge is an intersection point of the biased resonant voltage and the second reference voltage $V_{ref\,2}$. As shown in FIG. 9, a square wave signal with a dashed line is generated. If the second preset condition is not met, namely if $V_{ref\,2}\leq Uc+V_{ref\,0}\leq V_{ref\,1}$, a high level is not generated, and a low level signal is output. The sum n of the quantity of peaks and the quantity of troughs is equal to a quantity of rising edges.

806: The processing module determines the quality factor Q based on the second parameter (the sum of the quantity of peaks and the quantity of troughs).

The Q value is calculated according to the equation:

$$Q=\frac{n\cdot\pi}{m\cdot\ln\left(\left|\frac{U_0}{\Delta V}\right|\right)},\tag{14}$$

where m and n are positive integers, m≥1, Uc is the resonant voltage output by the oscillation circuit, a maximum value of Uc is $U_0$, $U_0$ is the voltage amplitude of the excitation voltage source Us, ΔV is the voltage difference. In addition, $\Delta V=V_{ref\,1}-V_{ref\,0}=V_{ref\,0}-V_{ref\,2}$, where $V_{ref\,0}$ is the bias voltage, $V_{ref\,1}$ is the first reference voltage, and $V_{ref\,2}$ is the second reference voltage.

Further, in this embodiment, when m=2, the quality factor Q is:

$$Q=\frac{n\cdot\pi}{2\cdot\ln\left(\left|\frac{U_0}{\Delta V}\right|\right)}.\tag{15}$$

or a calculation process of the foregoing equation (14), refer to the calculation process of the equation in Embodiment 1. Details are not described again.

807: The processing module monitors the foreign object based on the quality factor Q to obtain the monitoring result.

A method for determining, by the processing module based on the Q value, whether the foreign object exists in a wireless charging coil is the same as that in Embodiment 1. Details are not described herein again in this embodiment.

The wireless charging circuit provided in this embodiment monitors the sum of the quantity of peaks and the quantity of troughs in the half cycle by using the comparison module, to calculate the Q value. Compared with the case in which the voltage comparator is used for calculating the Q value, this case halves a measurement step unit. Because the step unit is smaller, a measurement result is more accurate, and whether the foreign object exists in the coil can be more accurately determined, to double monitoring accuracy of the Q value and enhance a capability of identifying the foreign object.

Figure 10:
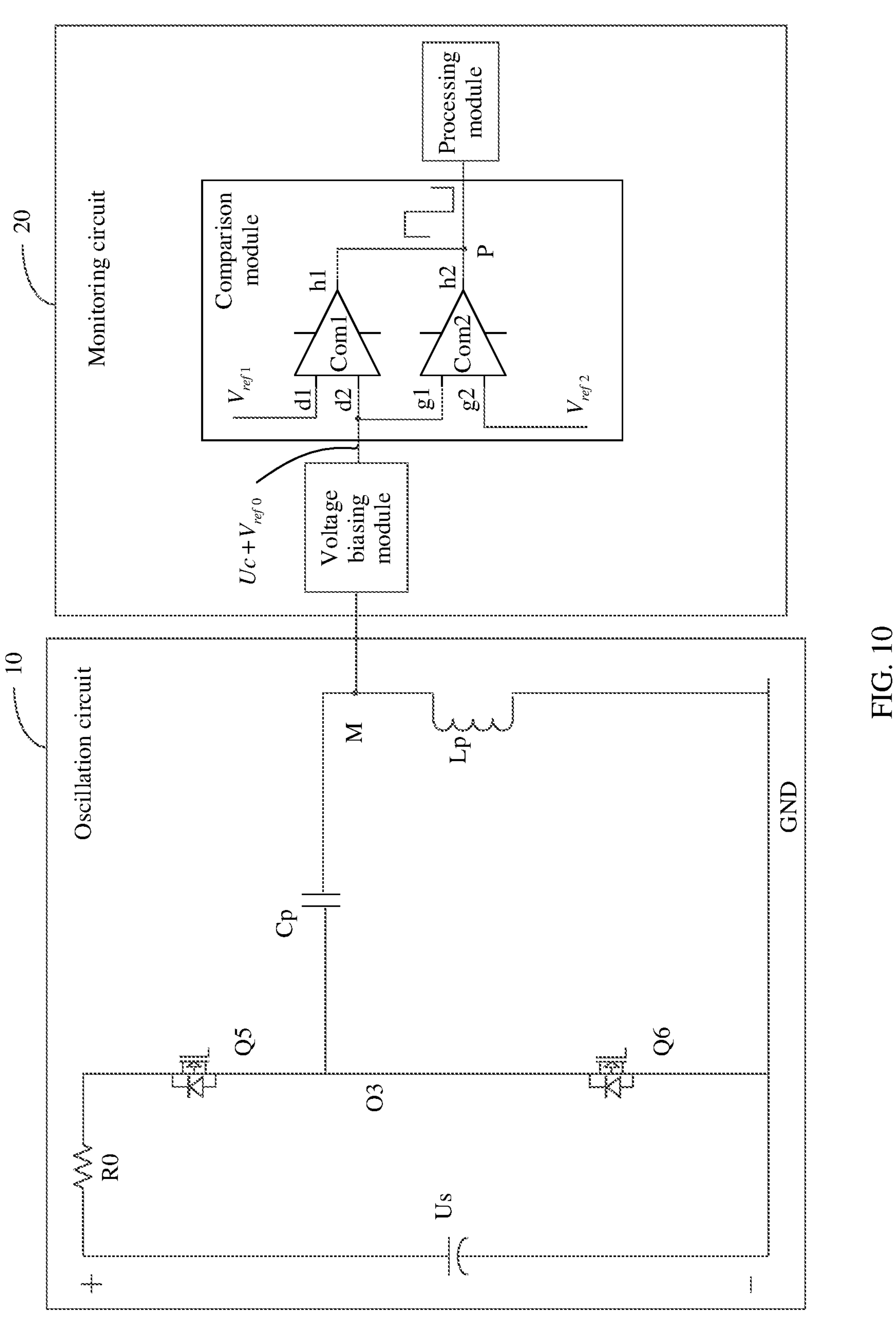
FIG. 10 is a schematic diagram of a structure of still another wireless charging circuit according to an embodiment.
Figure 11:
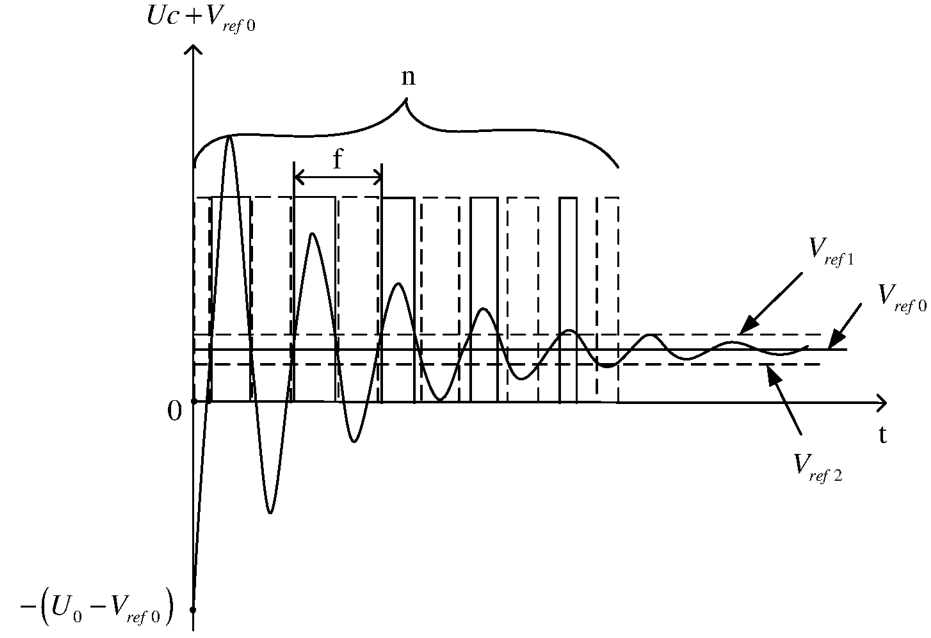
FIG. 11 is a schematic diagram of still another attenuation waveform of a resonant voltage generated by an oscillation circuit according to an embodiment.

In addition, optionally, in another structure of the wireless charging circuit, as shown in FIG. 10, the inductor Lp and the resonance capacitor Cp of the LC series circuit switch their positions. In this case, an attenuation waveform of a damped oscillation voltage generated during damped oscillation is transmitted. As shown in FIG. 11, the biased resonant voltage $UC+V_{ref\,0}$ starts to attenuate from $-(U_0-V_{ref\,0})$ in an oscillation manner. If $Uc+V_{ref\,0}>V_{ref\,1}$, a high level is output, and a rising edge is generated. A start moment of the rising edge is an intersection point of the biased resonant voltage and the first reference voltage $V_{ref\,1}$. As shown in FIG. 11, a square wave signal with a solid line is generated. If $Uc+V_{ref\,0}<V_{ref\,2}$, a high level is output. In this case, the second preset condition is met, and a rising edge is generated. A start moment of the rising edge is an intersection point of the biased resonant voltage and the second reference voltage $V_{ref\,2}$. As shown in FIG. 11, a square wave signal with a dashed line is generated. If $V_{ref\,2}\leq Uc+V_{ref\,0}\leq V_{ref\,1}$, the second preset condition is not met, a high level is not generated, and a low level signal is output.

Figure 12:
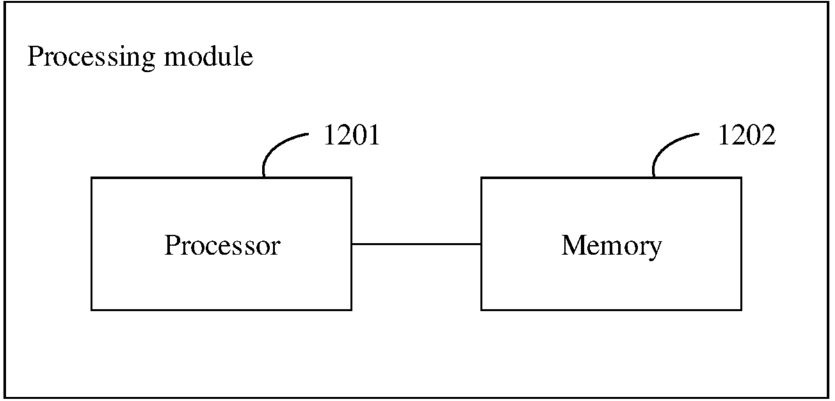
FIG. 12 is a schematic diagram of a structure of a processing module according to an embodiment.

In addition, the processing module in the foregoing embodiment may be a processing chip or a processing apparatus. As shown in FIG. 12, the processing module includes a processor 1201 and a memory 1202. The processor 1201 is coupled to the memory 1202. In addition, the processing module may further include more or fewer components, or combine some components, or have different component arrangements. This is not limited.

Further, the processor 1201 is a control center of the processing module, is connected to all parts of the entire apparatus through various interfaces and lines and runs or executes a software program or module stored in the memory 1202 and invokes data stored in the memory 1202 to implement a corresponding function.

The processor 1201 may include an integrated circuit (IC), for example, may include a single packaged IC, or may include a plurality of packaged Ics that are connected and that have a same function or different functions. For example, the processor 1201 may include a central processing unit (CPU) and the like.

The memory 1202 may include a volatile memory, for example, a random access memory (RAM); and may further include a non-volatile memory, for example, a flash memory, a hard disk drive (HDD), or a solid-state drive (SSD). The memory 1202 may further include a combination of the foregoing types of memories. The memory may store a program, code, or data.

In addition, the embodiments may further provides a non-transitory computer storage medium. The computer storage medium may store programs. When the programs are executed, some or all of the steps of the method for determining the Q value and the embodiments shown in FIG. 4*a*, FIG. 4*b*, and FIG. 8 may be included. The storage medium may be a magnetic disk, an optical disc, a read-only memory (ROM), a random access memory (RAM), or the like.

All or some of the foregoing embodiments may be implemented by using software, hardware, firmware, or any combination thereof. When the software is used for implementing embodiments, all or some of embodiments may be implemented in a form of a computer program product.

The computer program product includes one or more computer instructions, such as computation instructions. When a computer loads and executes the computer program, all or some of the procedures or functions are generated according to the embodiments. The computer may be a general-purpose computer, a dedicated computer, a computer network, or another programmable apparatus. In addition, the computer instructions may be stored in a non-transitory computer-readable storage medium.

The non-transitory computer-readable storage medium may be any usable medium accessible by a computer, or a storage device, such as a server or a data center, integrating one or more usable media. The usable medium may be a magnetic medium, for example, a floppy disk, a hard disk, a magnetic tape, an optical medium (for example, a DVD), a semiconductor medium, for example, a solid-state drive (SSD), or the like.

It should be understood that a wireless charging device provided may include, but is not limited to, the circuit structure of the wireless charging circuit in Embodiment 1 and Embodiment 2.

The processing module of the wireless charging circuit may be the processing chip or the processing apparatus shown in FIG. 12 and is configured to perform the method for determining the Q value in FIG. 4*a*, FIG. 4*b*, or FIG. 8.

In addition, it should be noted that the method for determining the Q value in embodiments may be applied to a transmit terminal device and may also be applied to a receive terminal device. For example, a to-be-charged device is a mobile phone. In addition, the method for determining the Q value and the method for monitoring the foreign object are used for monitoring a wireless charging environment of the mobile phone and may also be used for monitoring another charging environment, for example, vehicle-mounted charging.

An embodiment may further provide a wireless charging system. The system includes a transmit device and a receive device. The transmit device is the wireless charging device in the foregoing embodiment. The receive device is a to-be-charged device. Further, the wireless charging device includes the wireless charging circuit in Embodiment 1 or Embodiment 2 and is configured to implement the method for determining the Q value in embodiments and monitor a foreign object in a wireless charging coil.

The transmit device is the wireless charging device. The receive device is the to-be-charged device.

Optionally, the receive device further includes the wireless charging circuit in Embodiment 1 or Embodiment 2, is configured to implement the method for determining the Q value in embodiments and has a function of monitoring the foreign object in the wireless charging coil.

the receive device may include an oscillation circuit and a monitoring circuit that are sequentially connected.

The oscillation circuit includes an excitation voltage source, a full-bridge circuit, and an LC series circuit that are connected in series. The excitation voltage source is configured to provide a stable voltage for the LC series circuit.

The full-bridge circuit includes a first bridge arm and a second bridge arm that are connected in parallel. The first bridge arm includes a first switching transistor Q1 and a third switching transistor Q3. The second bridge arm includes a second switching transistor Q2 and a fourth switching transistor Q4. The LC series circuit includes an inductor and a resonance capacitor that are connected in series. One terminal of the LC series circuit is connected to a phase midpoint of the first bridge arm, and the other terminal is connected to a phase midpoint of the second bridge arm. A phase midpoint of the LC series circuit is connected to the monitoring circuit and is configured to output a resonant voltage signal during damped oscillation to the monitoring circuit.

The monitoring circuit includes a comparison module and a processing module. The comparison module is configured to receive the resonant voltage signal and convert the resonant voltage signal into a digital square wave signal. The processing module is configured to receive the digital square wave signal, obtain a resonant voltage attenuation waveform during damped oscillation based on turn-on and turn-off of the switching transistors Q1 to Q4, obtain a first parameter that meets a first preset condition and that is in the resonant voltage attenuation waveform, and determine a quality factor Q based on the first parameter. The first parameter includes a quantity of peaks, a quantity of troughs, or a sum of the quantity of peaks and the quantity of troughs.

For a circuit connection process and a method for determining the Q value, refer to descriptions in the foregoing embodiment. Details are not described herein again.

In addition, the processing module is further configured to monitor the foreign object based on the quality factor Q to obtain a monitoring result. If the quality factor Q is less than or equal to a first threshold, it is determined that the foreign object exists. If the quality factor Q is greater than a first threshold and less than or equal to a second threshold, it is determined that the foreign object may exist. If the quality factor Q is greater than a second threshold, it is determined that no foreign object exists.

In the embodiments and accompanying drawings, the term "first", "second", and so on are intended to distinguish between similar objects but do not necessarily indicate an order or sequence. In addition, the terms "include", "contain", and any other variants mean to cover the non-exclusive inclusion, for example, a process, method, system, product, or device that includes a list of steps or units is not necessarily limited to those expressly listed steps or units but may include other steps or units that are not expressly listed or that are inherent to such a process, method, system, or device.

For same or similar parts in embodiments of this specification, refer to each other. For example, Embodiment 2 and embodiments of the receive device are basically similar to a method embodiment, and therefore are described briefly. For related parts, refer to descriptions in the method embodiment.

The foregoing descriptions are implementations of embodiments but are not intended as limiting.

What is claimed is:

1. A wireless charging circuit, comprising
an oscillation circuit, wherein the oscillation circuit comprises:
an excitation voltage source,
a half-bridge circuit, and
an LC series circuit that are connected in series, wherein the LC series circuit comprises
an inductor and a resonance capacitor that are connected in series, wherein:
a first terminal of the LC series circuit is connected to a phase midpoint of the half-bridge circuit,
a second terminal of the LC series circuit is connected to the ground, and the excitation voltage source is configured to provide a stable voltage for the LC series circuit; and
a monitoring circuit, wherein a phase midpoint of the LC series circuit is connected to the monitoring circuit configured to output a resonant voltage signal during damped oscillation to the monitoring circuit, and the monitoring circuit comprises:
a voltage biasing module connected to the oscillation circuit and configured to:
receive the resonant voltage signal output by the oscillation circuit,
bias the resonant voltage signal, and
transmit a biased resonant voltage signal to the comparison module;
a comparison module configured to configured to:
receive the biased resonant voltage signal and
convert the biased resonant voltage signal into a digital square wave signal;
and
a processing module, wherein the comparison module and the processing module are sequentially connected, and
the processing module is configured to:
receive the digital square wave signal,
obtain a resonant voltage attenuation waveform during damped oscillation,
obtain a first parameter that meets a first preset condition in the resonant voltage attenuation waveform,
determine a quality factor Q based on the first parameter, and
monitor a foreign object based on the quality factor Q to obtain a monitoring result, wherein the first parameter comprises a quantity of peaks, a quantity of troughs, or a sum of the quantity of peaks and the quantity of troughs, and the quality factor Q represents a ratio of power stored in the oscillation circuit to a power loss in each cycle.

2. The wireless charging circuit according to claim 1, wherein the first preset condition is that in each oscillation cycle, a resonant voltage generated during damped oscillation is greater than a reference voltage; and
when a voltage of the phase midpoint of the LC series circuit to ground reaches an amplitude voltage of the excitation voltage source, the damped oscillation occurs in the oscillation circuit to generate the resonant voltage.

3. The wireless charging circuit according to claim 1, wherein
the first parameter comprises the sum of the quantity of peaks and the quantity of troughs, and the sum is the sum of the quantity of peaks that meets the first preset condition and the quantity of troughs that meets the first preset condition.

4. The wireless charging circuit according to claim 1, wherein the processing module is further configured to determine, based on the first parameter, the quality factor Q:

$$Q = \frac{n \cdot \pi}{m \cdot \ln(|U1/U2|)},$$

wherein
m and n are both positive integers, m≥1, and U1 and U2 are any peak voltage or any trough voltage in the resonant voltage attenuation waveform.

5. The wireless charging circuit according to claim 4, wherein when m=2, the quality factor Q is:

$$Q = \frac{n \cdot \pi}{2 \cdot \ln(|U1/U2|)},$$

wherein
n is the sum of the quantity of peaks and the quantity of troughs.

6. A device, wherein the device is a transmit device or a receive device, and the transmit device or the receive device comprises the wireless charging circuit according to claim 1.

7. A system comprising:
a transmit device and
a receive device, wherein transmit device comprises the wireless charging circuit according to claim 1, and the receive device is a to-be-charged device.

8. A wireless charging circuit, comprising
an oscillation circuit comprising:
an excitation voltage source,
a half-bridge circuit that comprises a fifth switching transistor Q5 and a sixth switching transistor Q6 that are connected in series, and
an LC series circuit that comprises an inductor and a resonance capacitor that are connected in series, wherein:
a first terminal of the LC series circuit is connected to a phase midpoint of the half-bridge circuit,
a second terminal of the LC series circuit is connected to the ground,
a phase midpoint of the LC series circuit is connected to the monitoring circuit and is configured to output a resonant voltage signal during damped oscillation to the monitoring circuit;

the excitation voltage source is configured to provide a stable voltage for the LC series circuit, and the excitation voltage source, the half-bridge circuit, and the LC series circuit connected in series; and a monitoring circuit, comprising:

a voltage biasing module, wherein the voltage biasing module is connected to the oscillation circuit and is configured to:

receive the resonant voltage signal output by the oscillation circuit, bias the resonant voltage signal, and transmit a biased resonant voltage signal to the comparison module;

a comparison module configured to:

receive the biased resonant voltage signal, convert the biased resonant voltage signal into a digital square wave signal, and output the digital square wave signal to the processing module, and a processing module, wherein the voltage biasing module, the comparison module, and the processing module are sequentially connected, and the processing module is configured to:

receive the digital square wave signal, obtain a resonant voltage attenuation waveform during damped oscillation, obtain a second parameter that meets a second preset condition in the resonant voltage attenuation waveform, determine a quality factor Q based on the second parameter, and monitor a foreign object based on the quality factor Q to obtain a monitoring result, wherein the second parameter comprises a sum of a quantity of peaks and a quantity of troughs, and the quality factor Q represents a ratio of power stored in the oscillation circuit to a power loss in each cycle.

9. The wireless charging circuit according to claim 8, wherein the second preset condition is:

$Uc+V_{ref\,0}>V_{ref\,1}$ or $Uc+V_{ref\,0}<V_{ref\,2}$, wherein

Uc is a resonant voltage generated during damped oscillation, $V_{ref\,0}$ is a bias voltage, $Uc+V_{ref\,0}$ is a resonant voltage biased by the voltage biasing module, $V_{ref\,1}$ is a first reference voltage, and $V_{ref\,2}$ is a second reference voltage; and when a voltage of the phase midpoint of the LC series circuit to ground reaches an amplitude voltage of the excitation voltage source Us, the damped oscillation occurs in the oscillation circuit to generate the resonant voltage.

10. The wireless charging circuit according to claim 9, wherein the sum of the quantity of peaks and the quantity of troughs is the sum of the quantity of peaks and the quantity of troughs that meets the second preset condition and that is determined, based on the digital square wave signal output by the comparison module, by the processing module when the fifth switching transistor Q5 is changed from on to off and the sixth switching transistor Q6 is changed from off to on.

11. The wireless charging circuit according to claim 8, wherein an input terminal of the comparison module is connected to an output terminal of the voltage biasing module, and an output terminal is connected to the processing module; the comparison module comprises a first comparator and a second comparator; the first comparator and the second comparator each comprise a first input terminal, a second input terminal, and an output terminal; the first input terminal of the first comparator is connected to a first voltage source, and is configured to obtain the first reference voltage provided by the first voltage source; the second input terminal of the first comparator and the first input terminal of the second comparator are connected to each other to be used as the input terminal of the comparison module; the second input terminal of the second comparator is connected to a second voltage source, and is configured to obtain the second reference voltage provided by the second voltage source; and the output terminal of the first comparator and the output terminal of the second comparator are connected to each other.

12. The wireless charging circuit according to claim 8, wherein the processing module is further configured to determine, based on the second parameter, the quality factor Q:

$$Q=\frac{n\cdot\pi}{m\cdot\ln\left(\left|\frac{U_0}{\Delta V}\right|\right)},$$

wherein n and m are both positive integers, m≥1, $U_0$ is a voltage amplitude of the excitation voltage source, ΔV is a voltage difference between a bias voltage and a reference voltage, and the reference voltage is the first reference voltage or the second reference voltage.

13. The wireless charging circuit according to claim 12, wherein when m=2, the quality factor Q is:

$$Q=\frac{n\cdot\pi}{2\cdot\ln\left(\left|\frac{U_0}{\Delta V}\right|\right)},$$

wherein n is the sum of the quantity of peaks and the quantity of troughs.

14. A wireless charging method applied to a wireless charging circuit comprising an oscillation circuit and a monitoring circuit that are sequentially connected, wherein the oscillation circuit comprises:

an excitation voltage source, a half-bridge circuit, and an LC series circuit that are connected in series, wherein:

the excitation voltage source is configured to provide a stable voltage for the LC series circuit;

the LC series circuit comprises an inductor and a resonance capacitor that are connected in series, a first terminal of the LC series circuit is connected to a phase midpoint of the half-bridge circuit, a second terminal of the LC series circuit is connected to the ground, a phase midpoint of the LC series circuit is connected to the monitoring circuit, and is configured to output a resonant voltage signal during damped oscillation to the monitoring circuit; and the monitoring circuit comprises;

a voltage biasing module connected to the oscillation circuit and configured to:

receive the resonant voltage signal output by the oscillation circuit, bias the resonant voltage signal, and transmit a biased resonant voltage signal to a comparison module; and a processing module, and the comparison module is configured to receive the resonant voltage signal, and convert the resonant voltage signal into a digital square wave signal; and the method comprises:

receiving, by the processing module, the digital square wave signal, wherein the digital square wave signal is generated by converting the resonant voltage signal;

obtaining, by the processing module, a resonant voltage attenuation waveform during damped oscillation;

obtaining, based on the resonant voltage attenuation waveform, a first parameter that meets a first preset condition, wherein the first parameter comprises a quantity of peaks, a quantity of troughs, or a sum of the quantity of peaks and the quantity of troughs; and determining, by the processing module, a quality factor Q based on the first parameter, and monitoring a foreign object based on the quality factor Q to obtain a monitoring result, wherein the quality factor Q represents a ratio of power stored in the oscillation circuit to a power loss in each cycle.

15. The wireless charging method according to claim 14, wherein the first preset condition is that in each oscillation cycle, a resonant voltage generated during damped oscillation is greater than a reference voltage; and when a voltage of the phase midpoint of the LC series circuit to ground reaches an amplitude voltage of the excitation voltage source Us, the damped oscillation occurs in the oscillation circuit to generate the resonant voltage.

16. The wireless charging method according to claim 14, wherein the first parameter comprises the sum of the quantity of peaks and the quantity of troughs, and the sum is the sum of the quantity of peaks that meets the first preset condition and the quantity of troughs that meets the first preset condition.

17. The wireless charging method according to claim 14, wherein determining, by the processing module, the quality factor Q based on the first parameter further comprises:

determining, by the processing module based on the first parameter, the quality factor Q:

$$Q = \frac{n \cdot \pi}{m \cdot \ln(|U1/U2|)},$$

wherein n and m are both positive integers, m≥1, and U1 and U2 are any peak voltage or any trough voltage in the resonant voltage attenuation waveform.

18. The wireless charging method according to claim 17, wherein when m=2, the quality factor Q is:

$$Q = \frac{n \cdot \pi}{2 \cdot \ln(|U1/U2|)},$$

and n is the sum of the quantity of peaks and the quantity of troughs.

* * * * *